(12) United States Patent
Zaerin

(10) Patent No.: US 8,515,639 B2
(45) Date of Patent: Aug. 20, 2013

(54) AUTOMATIC CLUTCH SYSTEM FOR AUTOMOBILES

(76) Inventor: Mehdi Zaerin, Isfahan (IR)

( * ) Notice: Subject to any disclaimer, the term of this patent is extended or adjusted under 35 U.S.C. 154(b) by 90 days.

(21) Appl. No.: 13/293,141

(22) Filed: Nov. 10, 2011

(65) Prior Publication Data

US 2012/0116639 A1    May 10, 2012

Related U.S. Application Data

(63) Continuation-in-part of application No. 12/563,522, filed on Sep. 21, 2009, now Pat. No. 8,167,079.

(51) Int. Cl.
*G06F 7/00* (2006.01)

(52) U.S. Cl.
USPC ............... 701/67; 701/51; 701/52; 701/55; 701/56; 701/62; 475/43; 475/65; 475/67; 477/5; 477/6; 477/8; 477/39; 477/57

(58) Field of Classification Search
USPC ............. 701/67, 51, 52, 55, 56, 62; 192/3; 475/43, 65, 67; 477/5, 6, 39, 57, 62, 70
See application file for complete search history.

(56) References Cited

U.S. PATENT DOCUMENTS

| | | | |
|---|---|---|---|
| 7,509,203 B2 * | 3/2009 | Imamura et al. | 701/67 |
| 8,066,619 B2 * | 11/2011 | Herchick et al. | 477/175 |
| 2012/0116639 A1 * | 5/2012 | Zaerin | 701/67 |

* cited by examiner

*Primary Examiner* — Redhwan K Mawari
(74) *Attorney, Agent, or Firm* — Barry Choobin; Choobin & Choobin Consulta Patent 360 LLC

(57) ABSTRACT

The embodiments herein provide an automatic clutch system for automobiles. The system comprises a mechanical section and an electronic section. The mechanical section comprises a rail support base with a rail-shaped ridge installed, dynamic parts installed on the rail-shaped ridge, supporting arms, an elevator mechanism connected to the clutch pedal and a clutch pedal lever. The electronic section comprises an input section for placing the elevator mechanism in due place and a keyboard for regulation, a sensor circuit, a command circuit including microcontroller, an exit section for changing a position of the elevator mechanism, a feedback circuit including a rotary encoder and monitors. The command circuit processes an instruction data from the input resources based on the regulations set by the user and transmits a command to the output section to position the elevator mechanism.

23 Claims, 23 Drawing Sheets

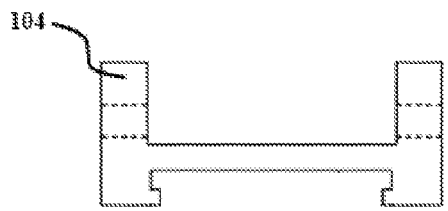 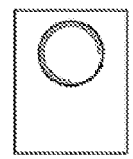
FIG. 3A  FIG. 3B
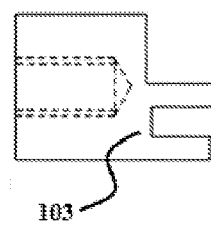 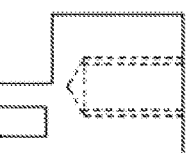
FIG. 3C  FIG. 3D
FIG. 3E
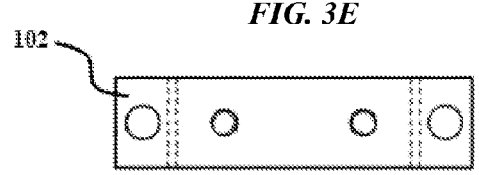
FIG. 3F

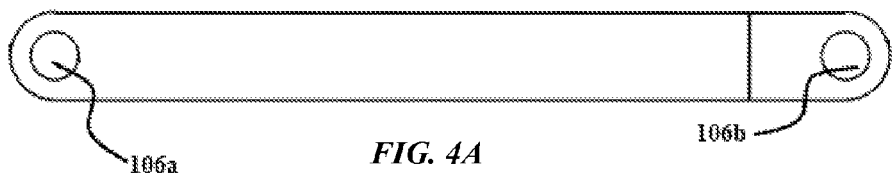
FIG. 4A
FIG. 4B
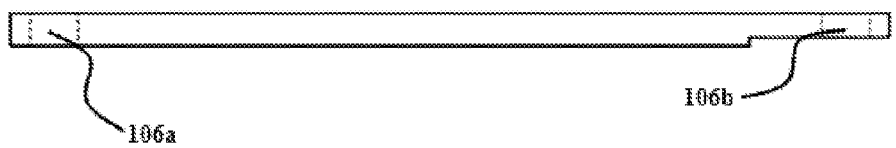
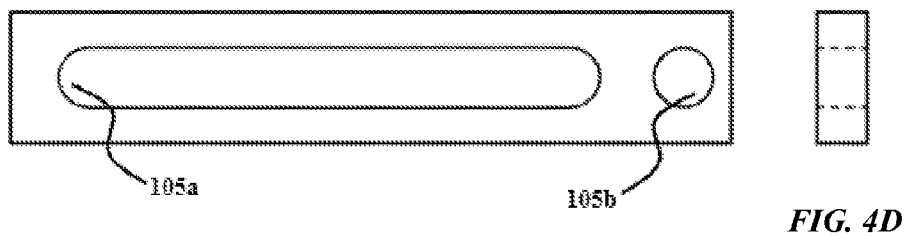
FIG. 4D
FIG. 4C 502
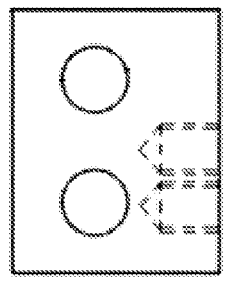 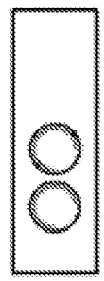
*FIG. 7A*  *FIG. 7B*

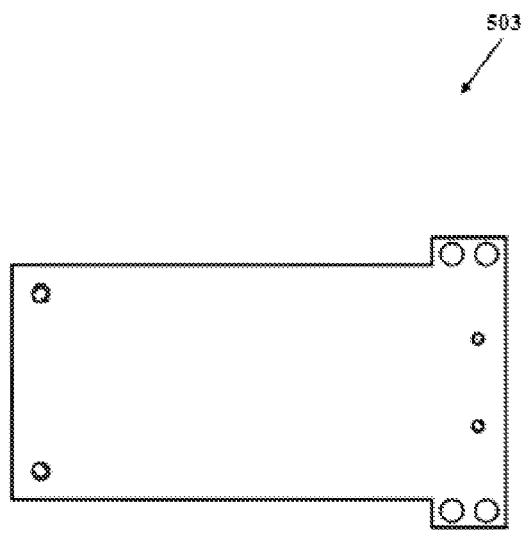
*FIG. 8A*
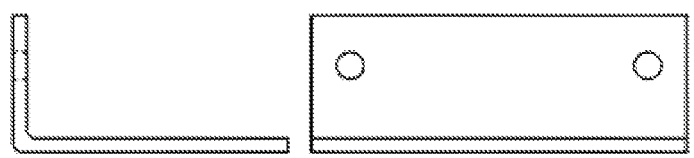
*FIG. 8B*   *FIG. 8C*

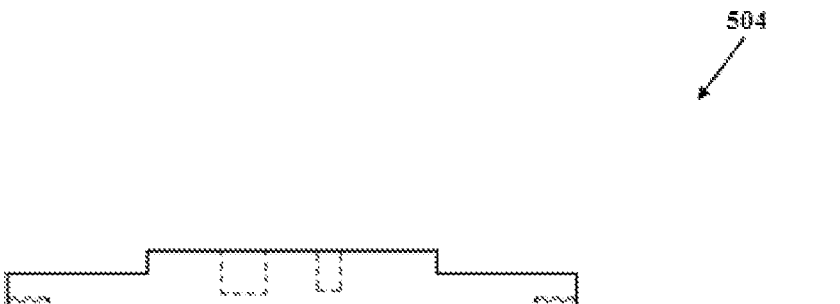
504
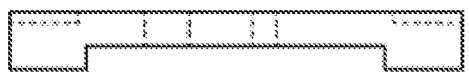
*FIG. 9A*
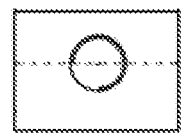
*FIG. 9B*
*FIG. 9C*
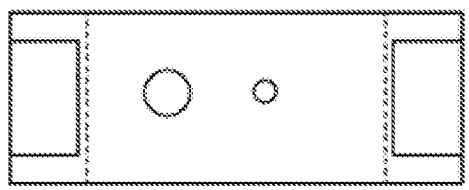
*FIG. 9D*

505
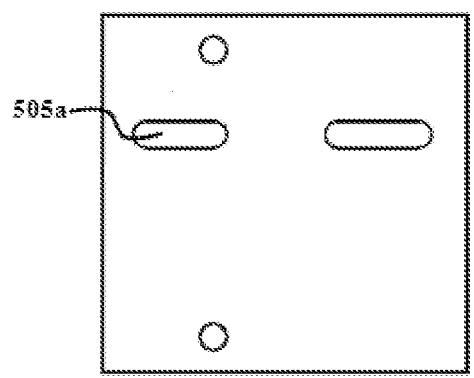
*FIG. 10A*  *FIG. 10B*
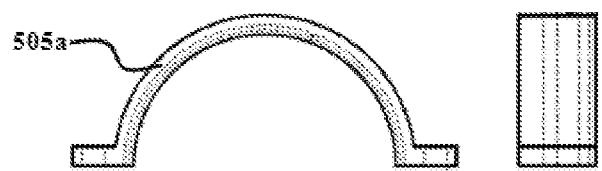
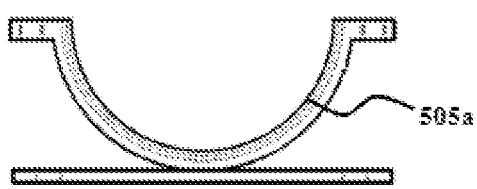
*FIG. 10D*
*FIG. 10C*

*FIG. 12A*
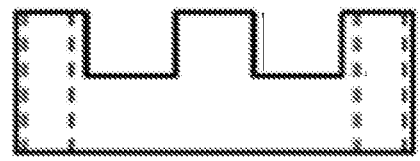
*FIG. 12B*

141

509

161
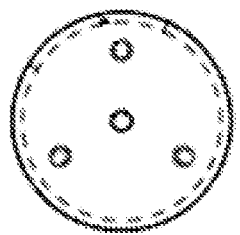 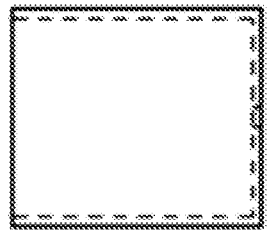
*FIG. 15A*          *FIG. 15B*

108b
*FIG. 18A*
*FIG. 18B*
*FIG. 18C*

108c

108e

AUTOMATIC CLUTCH SYSTEM FOR AUTOMOBILES

CROSS REFERENCE TO RELATED APPLICATIONS

The present invention is a continuation in part of application with Ser. No. 12/563,522 filed on Sep. 21, 2009 now U.S. Pat. No. 8,167,079.

BACKGROUND

1. Technical Field

The embodiments herein generally relate to motor vehicles and particularly to power transmission in motor vehicles. The embodiments herein more particularly relates to an automatic clutch system for power transmission in motor vehicles.

2. Description of the Related Art

For driving motor vehicles, the output power of the combustion engine must be transmitted to the driving wheels. The power of the engine is transmitted through a clutch to the gearbox. Usually, the clutch is engaged which can be disengaged by depressing a pedal, actuating a hand lever, or by any electromagnetic operating elements. The clutch disengaged to interrupt the power transmission from the engine to the gearbox and to permit an easy shifting of the gears.

Despite the advent and popularity of automatic transmissions, several automobiles and trucks are presently constructed with manually operated gear shifts. The vehicles with manual transmissions generally have several advantages, including increased fuel efficiency and better control of the vehicle. However, such vehicles must be equipped with independently operated clutches to disengage the engine from the drive shaft while the gears are being shifted. Since this action requires the application of a substantial force, a purely mechanical clutch must be actuated by the driver through a foot pedal mechanism.

Vehicles with manually operated throttles, brakes, and headlight dimmer switches are well known in the art. Conventional technologies also teach manual clutch control systems that are hydraulically or pneumatically powered with compressed air, brake-type fluid, or similar working fluids, or connected to the engine manifold vacuum system. These clutches are controlled generally by a manual operation of a hydraulic valve or a fluid switch, whereby a source of hydraulic power may be connected to a hydraulic cylinder and a piston arrangement or other equivalent energy-conversion mechanism which drives the clutch plates. These valves have an on-off character which precludes a gradual engagement or disengagement of the clutch and the rate of operation of the clutch is not subjected to the driver's control but is determined by the parameters of the hydraulic circuit in these systems. Hence a gradual engagement of the clutch during the starting of the vehicle from a standstill or the slipping of the clutch while driving under special conditions is not feasible with such a manual control valve. Also a constant gear shifting is required while driving in high traffic streets, which is a difficult task especially for the people who drive for a long time and suffering from a foot pain or a back ache.

There exists a need for an automatic clutch system to modify the regular stick shift automobiles to an automatic system for power transmission in motor vehicles.

The abovementioned shortcomings, disadvantages and problems are addressed herein and which will be understood by reading and studying the following specification.

OBJECTS OF THE EMBODIMENTS

The primary object of the embodiments herein is to provide an automatic clutch system to modify a regular manual transmission in the automobiles to an automatic system for power transmission in the motor vehicles.

Another object of the embodiments herein is to provide an automatic clutch system which eliminates the need for a clutch pedal when a driver brakes and tries to stop the vehicle.

Yet another object of the embodiments herein is to provide an automatic clutch system which eliminates the need for applying a clutch at the time of starting the vehicle.

Yet another object of the embodiments herein is to provide an automatic clutch system which eliminates the need of a clutch for changing gears.

Yet another object of the embodiments herein is to provide an automatic clutch system which can be easily installed on all vehicles having clutch system.

Yet another object of the embodiments herein is to provide an automatic clutch system which is capable of being regulated for a variety of clutch pedals.

These and other objects and advantages of the present invention will become readily apparent from the following detailed description taken in conjunction with the accompanying drawings.

SUMMARY

The various embodiments herein provide an automatic clutch system for eliminating the use of a clutch pedal in a vehicle while driving. According to an embodiment herein, an automatic clutch system for automobiles comprises a mechanical section and an electronic section. The mechanical section comprises a rail support base with a rail-shaped ridge installed on a flooring of a vehicle, a plurality of dynamic parts installed on the rail-shaped ridge, a first set of supporting arms, a second set of supporting arms, a clutch pedal of the vehicle, an elevator mechanism connected to the clutch pedal, and a clutch pedal lever for measuring and receiving a command from a gas pedal.

The electronic section comprises an input section for providing an instruction related to a positioning and a regulation of the elevator mechanism, an output section to change a linear position of the elevator mechanism according to the instruction from the input section, a feedback circuit for maintaining a stability of a clutch operating system, a plurality of monitors for displaying an information related to a functioning status of the clutch operating system and a side regulations, a sensor circuit including a plurality of speed sensors to receive a data related to a speed of the vehicle and to regulate a clutching action in proportion to the speed of the vehicle, and a command circuit to receive a data from the input section, and to send a command to the output section, and to investigate an output reaction by the feedback circuit and to display the output reactions and to control the regulations on a plurality of monitors.

The command circuit of the electronic section processes an instruction data from an input resources through a microcontroller based on the regulations set by the user and transmits a command instruction to the output section for a positioning of the elevator mechanism in the vehicle.

The rail support base has a plurality of pyramidal ridges provided on a bottom surface to rigidly fix the rail support base on the flooring of the vehicle. The dynamic parts are provided with a plurality of ridges on a bottom surface to fix on the rail-shaped ridge of the rail support base. The dynamic parts include a first dynamic part, a second dynamic part and a third dynamic part. The first dynamic part connects the rail support base to the flooring of the vehicle through a plurality of bolts. The second dynamic part and the third dynamic part support the elevator mechanism over the rail support base.

One end of the first set of supporting arms is connected to a lower section of the elevator mechanism and an another end of the first set of supporting arms are connected to the second dynamic frame to support the elevator mechanism over the rail support base. one end of the second set of supporting arms is connected to the elevator mechanism at the center and an another end of the second set of supporting arms are connected to the third dynamic frame so that an inclination angle of the elevator mechanism is varied with respect to the clutch pedal of the vehicle.

The elevator mechanism has flooring connected to the rail support base through the first set of supporting arms and the second dynamic frame. The elevator mechanism has a lower elevator axle and an upper elevator axle. The lower elevator axle and the upper elevator axle include a plurality of coils. The lower elevator axle and the upper elevator axle are arranged at an upper section and at a lower section of the elevator mechanism. A length of the upper elevator axles is more than a length of the lower elevator axles such that one end of the upper elevator axles protrudes from the parallel rails thereby connecting one end of the upper elevator axles to an electromotor shaft and connecting another end of the upper elevator axles to an encoder in the elevator mechanism.

The feedback circuit reports an output status to the command circuit to assess the output status and to maintain a stability of the system. The inputs status, the outputs status, the feedback and general alignments are displayed in the plurality of monitors all the time.

The gas pedal rotates around an axle when a pressure is applied on the gas pedal. The gas pedal is connected to a rotary encoder and the rotary encoder generates 360 pulses for each rotation resulting in a change in an angle of the elevator mechanism. The processor receives the pulses generated by the rotary encoder to calculate a rate of change of the angle of the elevator mechanism to send a required command to the output section.

The output section further comprises a DC engine to convert an electrical energy into a mechanical energy for changing a position of the elevator mechanism. The output circuits, input circuits, samplers and monitors are attached to the microcontroller in the command circuit.

The axle of the rotary encoder is directly connected to an axle of an engine in the feedback circuit. The axle of the rotary encoder is rotated once corresponding to each rotation of the axle of the engine. The microcontroller processes the pulses generated by the encoder to analyze a data related to a position of the elevator mechanism to ensure a stability of the system.

The system further comprises a command box for regulating the automatic clutch system. The command box comprises a key pad for regulating and changing data. The command box includes a 7-section monitor to display all digits related to the regulations and to register a change with respect to a reaction of elevator mechanism. The command box includes a graphic LCD monitor to display a location of the elevator mechanism in numerical percentages.

The elevator mechanism further comprises a plurality of parallel rails with grooves. A lower end of the plurality of parallel rails is connected to the lower elevator axle. An upper end of the plurality of parallel rails is connected to the upper elevator axle. A plurality of moving blocks is placed inside the grooves by a plurality of ball bearings. A flooring is connected to the plurality of moving blocks to move with a movement of the plurality of moving blocks inside the plurality of parallel rails. A lower frame is provided to connect a lower end of the plurality of parallel rails to the second set of supporting arms. An upper frame with a furrow is connected to an upper end of the plurality of parallel rails. An electromotor is placed inside the furrow provided in the upper frame. A chain is arranged to connect the upper elevator axles to an electromotor shaft with a plurality of cogwheels thereby enabling the upper elevator axles to move along with a movement of the electromotor. A twin chain set is placed around the upper elevator axles and the lower elevator axles by a plurality of cogwheels for connecting the upper elevator axles and the lower elevator axles to each other such that the lower elevator axles rotates with a rotation of the upper elevator axles. A clamp is provided for connecting the twin chains set to the flooring to move the flooring with a movement of the twin chain set. A twin chain regulation clamp is placed among the plurality of parallel rails to regulate softness and tightness of the twin chain set.

A central support frame is connected to the plurality of parallel rails at a center. The central support frame is suspended to connect the elevator mechanism to the first set of supporting arms. A connecting clamp is arranged for connecting a first encoder to one ends of the upper elevator axles such that the first encoder shaft rotates with a rotation of the upper elevator axles to measure a movement of the elevator mechanism.

The clutch pedal lever further comprises a set of supporting arms connected to one end of the plurality of rail support base and a connector lever. The connector lever includes a coil of wire screwed inside a vacuum pipe to adjust a length of the screwed wire. A support base is connected to the screwed wire of the connector lever. The supporting base is connected to the connecter lever such that the connector lever creates an angle of 90° with the screwed wire. The rail support base and the set of supporting arms are placed collaterally against each other so as to share a single axis.

The gas lever further comprises a handhold placed underneath the gas pedal and a shaft is placed inside a main box. A connector bushing is provided for connecting the shaft to the handhold. A spring is arranged for providing an elastic rotation to the shaft. A rotary encoder is connected to the shaft attached to handhold by a fine bushing and the fine bushing is arranged inside the main box. An encoder support frame is connected to the main box by a plurality of bolts. The system further comprises a connector coils installed inside a plurality of grooves provided on the set of support arms to regulate a distance between the support arms and the gas pedal of the vehicle. The handhold is tightened by a bolt to an end of the shaft to regulate a handhold angle from the gas pedal such that the connection of handhold to shaft is removed upon loosing the bolt to regulate the angle of the handhold from the gas pedal in the vehicle. A second encoder is installed in the gas lever to measure an action of the gas pedal in the vehicles. The first encoder installed in the elevator mechanism and the second encoder installed in the gas pedal are connected to the electronic section.

The automatic clutch system controls a clutching operation based on a pressure applied on the gas pedal in proportion to a speed of the vehicle through a single regulation of the electrical circuit. The automatic clutch system comprises a mechanical section and an electronic section. The mechanical section of the automatic clutch system comprises a rail support base with a rail-shaped ridge installed on the flooring of the vehicle, a plurality of dynamic parts installed on the rail-shaped ridge of the rail support base, a first set of support arms, a second set of supporting arms, an elevator mechanism and a clutch pedal lever for measuring and receiving the orders from a gas pedal.

According to an embodiment herein, the electronic section of the automatic clutch system comprises an input section including at least three order transmission sources for placing an elevator mechanism in a due place and a keyboard for regulating the system by a user and an output section to change a linear position of an elevator mechanism according to the received data. The electronic section further comprises a feedback circuit including a rotary encoder for maintaining a stability of the system, a plurality of monitors for displaying an information related to a functioning status of the system and side regulations and a circuit including one or more speed sensors to receive a data on the vehicle's speed and to regulate a clutching action in proportion to the vehicle's speed. The electronic section further comprises a command circuit including a microcontroller to receive a data from the input section, send order to the output section, investigating an output reaction by the feedback circuit and representing all the reactions occurred and controlling the regulations on monitors.

According to an embodiment herein, the command circuit of the electronic section receives a data from the input resources. The command circuit analyses the regulations made by the user and processes the data through a microcontroller in accordance with the regulations. The command circuit then transmits the processed data as instructions required for placing the elevator mechanism of the mechanical section in the desired place.

According to an embodiment herein, the rail support base of the mechanical section of the automatic clutch system is provided with the pyramidal ridges on a bottom surface to rigidly fix the rail support base on the flooring of the vehicle. The dynamic parts are provided with the ridges on the bottom surface to fix on the rail-shaped ridge of the rail support base to allow a forward and a backward movement on the rail support base. The dynamic parts include a first dynamic part to connect the rail support base to the flooring of the vehicle through a plurality of bolts, a second dynamic part and a third dynamic part to support the elevator mechanism over the rail support base.

According to an embodiment herein, one end of the first set of support arms is connected to a lower section of the elevator mechanism and another end of the first set of support arms is connected to the second dynamic frame to support the elevator mechanism over the rail support base. Similarly one end of the second set of support arms is connected to the elevator mechanism at the center and the other end of the second set of support arms is connected to the third dynamic frame so that the inclination angle of the elevator mechanism is varied against the clutch pedal of the vehicle.

According to an embodiment herein, the flooring of the elevator mechanism is connected to the rail support base through the first set of support arms and the second dynamic frame. A lower elevator axle and an upper elevator axle include a plurality of coils at an upper section and a lower section of the elevator mechanism. The length of the upper elevator axles is more than the length of the lower elevator axles such that one end of the upper axles protrudes from the parallel rails enabling at least one end of the upper elevator axle to connect to the electromotor shaft and other end of the upper elevator axle to connect to the encoder of the elevator mechanism.

According to an embodiment herein, the feedback circuits of the electronic section reports an output status to the command circuit in order to assess the output status and to maintain the stability of the system. The inputs status, the outputs status, the feedback and general alignments are represented in the plurality of monitors all the time. The input section keyboard provided in the input section enables to input the required regulations including a speed of elevator mechanism, the desired points for placing the elevator mechanism and a regulation reaction time of the elevator mechanism. Upon putting pressure on the gas pedal, the gas pedal rotates around an axle and the rotary encoder connected to the gas pedal generates 360 pulses for each rotation resulting in a change in the angle of the elevator mechanism. The rate of change in the angle of the elevator mechanism is reported to a processor through the pulses generated by rotary encoder and the processor sends the required order to the output section.

According to an embodiment herein, the output section further comprises a DC engine to convert an electrical energy into a mechanical energy for changing a position of the elevator mechanism. The output circuits, input circuits, samplers and monitors are attached to the microcontroller in the command circuit.

According to an embodiment herein, the axle of the rotary encoder is directly connected to the engine's axle in the feedback circuit and with every rotation of engine's axle, the axle of the rotary encoder rotates once and by processing the pulses generated by the microcontroller, the exact details concerning a position of the elevator mechanism for the stability of the system is analyzed.

According to an embodiment herein, the electronic section further comprises a command box for the regulation of the automatic clutch system. The key pad is installed on the command box for regulating and changing data. The automatic clutch system leaves the electronic section and stops functioning, when the command box is in settings phase or is rendering previously-saved data. Further a plurality of 7-section monitors is installed on the command box to display all digits related to the regulations and registers the changes in a reaction of the elevator mechanism. A graphic LCD monitor is also installed on the command box to display a numerical percentage of elevator mechanism's location.

According to an embodiment herein, the elevator mechanism of the mechanical section further comprises a plurality of parallel rails with grooves, a plurality of moving blocks placed inside the grooves of the plurality of parallel rails by a plurality of ball bearings, a flooring connected to a plurality of moving blocks arranged inside the plurality of parallel rails, a lower frame to connect a lower end of the plurality of parallel rails to the second set of supporting arms, a upper frame with a furrow connected to the upper end of the plurality of parallel rails, an electromotor placed inside the furrow provided in the upper frame, the lower elevator axles connected to the lower ends of the plurality of parallel rails by a plurality of ball bearings, the upper elevator axles connected to the upper ends of the plurality of parallel rails by a plurality of ball bearings, a chain arranged to connect the upper elevator axles to an electromotor shaft with a plurality of cogwheels for enabling the upper elevator axles to move with the movement of the electromotor, a twin chain set placed around the upper elevator axles and the lower elevator axles by a plurality of cogwheels for connecting the upper elevator axles and the lower elevator axles to each other such that the lower elevator axles rotates with the rotation of the upper elevator axles, a clamp for connecting the twin chains set to the flooring in order to move the flooring with the movement of the twin chain set, a twin chain regulation clamp placed between the plurality of parallel rails to regulate a loosening and a tightening of the twin chain set. Further a central support frame is connected to the plurality of parallel rails at the center and suspended to connect the elevator mechanism to the first set of supporting arms. Then a connecting clamp is adopted for connecting a first encoder to one end of the upper elevator axles such that an encoder shaft rotates with a rotation of the upper elevator axles to measure a movement of the elevator mechanism. The first encoder installed in the elevator mechanism measures a clutching rate in the vehicles and transfers an order of clutching to the elevator.

According to an embodiment herein, the clutch pedal lever further comprises a set of supporting arms connected to one end of the plurality of rail support base of a mechanical section and placed collaterally against each other such that the set of supporting arms are in the same direction with the plurality of rail support base. A connector lever including a coil of wire is screwed inside a vacuum pipe to reduce or increase a length of the screw wire. A support base is connected to the screw wire of the connector lever and acts as a supporting base for the gas lever.

According to an embodiment herein, the gas lever further comprises a handhold placed underneath the gas pedal, a shaft placed inside a main box, a connector bushing for connecting the shaft to the handhold, a spring for providing an elastic rotation to the shaft, a rotary encoder connected to the shaft attached to the handhold by a fine bushing inside the main box and an encoder support frame connected to the main box through a plurality of bolts.

According to an embodiment herein, a plurality of connector coils are installed inside a plurality of grooves provided on the set of support arms (first set and second set) to regulate the distance between the support arms and the gas pedal of the vehicle. The set of support arms are placed at either sides of clutch pedal in the vehicle. The support base is connected to the connecter lever such that the connector lever creates an angle of 90° with the screw wire. The handhold is tightened by a bolt to the end of the shaft to regulate the handhold angle from the gas pedal. By losing the said bolt, the connection of handhold to the shaft is removed and then the angle of the handhold from the gas pedal in the vehicle is regulated. Further a second encoder is installed in the gas lever to measure the gas pedal's functioning in the vehicles. The first encoder installed in the elevator mechanism and the second encoder installed in the gas pedal are connected to the electronic section of the automatic clutch system.

According to an embodiment herein, the automatic clutch system controls a clutching operation based on a pressure applied on the gas pedal and in proportion to a vehicle's speed and through a single regulation of the system's electrical circuit.

These and other aspects of the embodiments herein will be better appreciated and understood when considered in conjunction with the following description and the accompanying drawings. It should be understood, however, that the following descriptions, while indicating the preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The other objects, features and advantages will occur to those skilled in the art from the following description of the preferred embodiment and the accompanying drawings in which:

FIG. 3A illustrates a side view of a third dynamic part along a length direction of the mechanical section of the automatic clutch system, according to an embodiment herein.

FIG. 3B illustrates a side view of a third dynamic part along a breadth direction in the mechanical section of the automatic clutch system, according to an embodiment herein FIG. 3C illustrates a side view of a second dynamic part along a length direction of the mechanical section of the automatic clutch system, according to an embodiment herein.

FIG. 3D illustrates a side view of a second dynamic part along a breadth direction of the mechanical section of the automatic clutch system, according to an embodiment herein.

FIG. 3E illustrates a side view of a first dynamic part of the mechanical section of the automatic clutch system, according to an embodiment herein.

FIG. 3F illustrates a top view of a first dynamic part of the mechanical section of the automatic clutch system, according to an embodiment herein.

FIG. 4A illustrates a front view of a first set of supporting arms in an elevator mechanism in the mechanical section of the automatic clutch system, according to an embodiment herein.

FIG. 4B illustrates a side view of a first set of supporting arms in an elevator mechanism in the mechanical section of the automatic clutch system, according to an embodiment herein.

FIG. 4C illustrates a front view of a second set of supporting arms in an elevator mechanism in the mechanical section of the automatic clutch system, according to an embodiment herein.

FIG. 4D illustrates a side view of a second set of supporting arms in an elevator mechanism in the mechanical section of the automatic clutch system, according to an embodiment herein.

FIG. 7A illustrates a front view of moving blocks of the elevator mechanism in the mechanical section of the automatic clutch system, according to an embodiment herein.

FIG. 7B illustrates a side view of moving blocks of the elevator mechanism in the mechanical section of the automatic clutch system, according to an embodiment herein.

FIG. 8A illustrates a top view of a flooring of the elevator mechanism in the mechanical section of the automatic clutch system, according to an embodiment herein.

FIG. 8B illustrates a side view of a flooring of the elevator mechanism in the mechanical section of the automatic clutch system, according to an embodiment herein.

FIG. 8C illustrates another side view of a flooring of the elevator mechanism in the mechanical section of the automatic clutch system, according to an embodiment herein.

FIG. 9A illustrates a front view of a lower frame of an elevator mechanism in the mechanical section of the automatic clutch system, according to an embodiment herein.

FIG. 9B illustrates a side view of a lower frame of an elevator mechanism in the mechanical section of the automatic clutch system, according to an embodiment herein.

FIG. 9C illustrates another side view of a lower frame of an elevator mechanism in the mechanical section of the automatic clutch system, according to an embodiment herein.

FIG. 9D illustrates a top view of a lower frame of an elevator mechanism in the mechanical section of the automatic clutch system, according to an embodiment herein.

FIG. 10A illustrates a top view of an upper frame of an elevator mechanism in the mechanical section of the automatic clutch system, according to an embodiment herein.

FIG. 10B illustrates a side view of an upper frame of an elevator mechanism in the mechanical section of the automatic clutch system, according to an embodiment herein.

FIG. 10C illustrates a side view of a furrow in an upper frame of an elevator mechanism in the mechanical section of the automatic clutch system, according to an embodiment herein.

FIG. 10D illustrates a top view of a furrow in an upper frame of an elevator mechanism in the mechanical section of the automatic clutch system, according to an embodiment herein.

FIG. 12A illustrates a top view of a connection clamp of the mechanical section of the automatic clutch system, according to an embodiment herein.

FIG. 12B illustrates a side view of a connection clamp of the mechanical section of the automatic clutch system, according to an embodiment herein.

FIG. 15A illustrates a top view of a connecting clamp for encoder in an elevator mechanism at the mechanical section of the automatic clutch system, according to an embodiment herein.

FIG. 15B illustrates a side view of a connecting clamp for encoder in an elevator mechanism at the mechanical section of the automatic clutch system, according to an embodiment herein.

FIG. 18A illustrates a front side view of a vacuum pipe in a connector lever of a clutch pedal lever in an elevator mechanism at the mechanical section of the automatic clutch system, according to an embodiment herein.

FIG. 18B illustrates a side view of a vacuum pipe in a connector lever of a clutch pedal lever in an elevator mechanism at the mechanical section of the automatic clutch system, according to an embodiment herein.

FIG. 18C illustrates a side view of a coil in a connector lever of a clutch pedal lever in an elevator mechanism at the mechanical section of the automatic clutch system, according to an embodiment herein.

Figure 1:
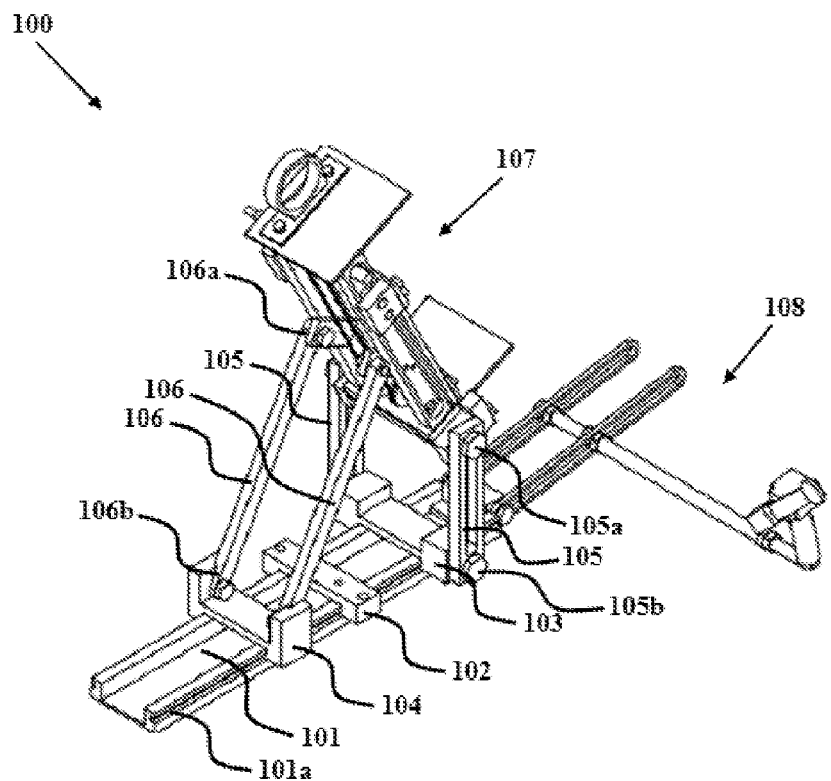
FIG. 1 illustrates a side perspective view of a mechanical section of an automatic clutch system, according to an embodiment herein.

Although the specific features of the present invention are shown in some drawings and not in others. This is done for convenience only as each feature may be combined with any or all of the other features in accordance with the present invention.

DETAILED DESCRIPTION

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

The various embodiments herein provide an automatic clutch system for eliminating the use of clutch pedal in a vehicle while driving. The automatic clutch system comprises a mechanical section and an electronic section. The mechanical section of the automatic clutch system comprises a rail support base with a rail-shaped ridge installed on the flooring of the vehicle, a plurality of dynamic parts installed on the rail-shaped ridge of the rail support base, a first set of support arms, a second set of supporting arms, an elevator mechanism and a clutch pedal lever for measuring and receiving orders from a gas pedal.

According to an embodiment herein, the electronic section of the automatic clutch system comprises an input section including at least three order transmission sources for placing an elevator mechanism in a due place and a keyboard for regulating the system by a user and an output section for changing a linear position of the elevator mechanism according to the received data. The electronic section further comprises a feedback circuit including a rotary encoder for maintaining the stability of the system, a plurality of monitors for displaying an information regarding the functioning status of the system and side regulations and a circuit including one or more speed sensors to receive a data related to the vehicle's speed and to regulate a clutching action in proportion to the vehicle's speed. The electronic section further comprises a command circuit including a microcontroller to receive a data from the input section, to send order to the output section, to process the output reaction by the feedback circuit and all the occurred reactions, and to control regulations on monitors.

According to an embodiment herein, the command circuit of the electronic section receives data from input resources. The command circuit analyses the regulations made by the user and processes the data through a microcontroller in accordance with the regulations. The command circuit then transmits the processed data as instructions required for placing the elevator mechanism of the mechanical section in the desired place.

According to an embodiment herein, the rail support base of the mechanical section of the automatic clutch system is provided with the pyramidal ridges on the bottom surface to rigidly fix the rail support base on the flooring of the vehicle. The dynamic parts are provided with the ridges on the bottom surface to fix on the rail-shaped ridge of the rail support base to allow a forward and a backward movement on the rail support base. The dynamic parts include a first dynamic part to connect the rail support base to the flooring of the vehicle through a plurality of bolts, a second dynamic part and a third dynamic part to support the elevator mechanism over the rail support base.

According to an embodiment herein, one end of the first set of support arms is connected to a lower section of the elevator mechanism and other end of the first set of support arms is connected to the second dynamic frame to support elevator mechanism over the rail support base. Similarly, one end of the second set of support arms is connected to the elevator mechanism at center and the other end of the second set of support arms is connected to the third dynamic frame so that the inclination angle of the elevator mechanism is varied against the clutch pedal of the vehicle.

According to an embodiment herein, the flooring of the elevator mechanism is connected to the rail support base through the first set of support arms and the second dynamic frame. The lower elevator axle and the upper elevator axles include a plurality of coils at the upper section and at the lower section of the elevator mechanism. The length of the upper elevator axles is more than the length of the lower elevator axles such that one end of the upper axles protrudes from the parallel rails so as to connect at least one end of the upper elevator axle to the electromotor shaft and the other end of the upper elevator axles to the encoder of the elevator mechanism.

According to an embodiment herein, the feedback circuits of the electronic section reports the output status to the command circuit in order to assess the output status and to maintain the stability of the system. The inputs status, the outputs status, the feedback and general alignments are represented in the plurality of monitors all the time. The input section keyboard provided in the input section enables to input the required regulations including the speed of elevator mechanism, the desired points for placing the elevator mechanism and a regulation reaction time of the elevator mechanism. Upon putting pressure on the gas pedal, the gas pedal rotates around an axle and the rotary encoder connected to the gas pedal generates 360 pulses for each rotation resulting in a change in the angle of the elevator mechanism. The rate of change in the angle of the elevator mechanism is reported to a processor through the pulses generated by the rotary encoder and the processor sends the required commands/order to the output section.

According to an embodiment herein, the output section further comprises a DC engine to convert an electrical energy into a mechanical energy for changing a position of the elevator mechanism. The output circuits, input circuits, samplers and monitors are attached to the microcontroller in the command circuit.

According to an embodiment herein, the axle of the rotary encoder is directly connected to the engine's axle in the feedback circuit. With every rotation of engine's axle, the axle of the rotary encoder rotates once. By processing the pulses generated by the microcontroller, the exact details regarding the positioning of the elevator mechanism for the stability of the system is analyzed.

According to an embodiment herein, the electronic section further comprises a command box for regulating the automatic clutch system. The key pad is installed on the command box for regulating and changing data. The automatic clutch system leaves the electronic section and stops functioning, when the command box is in a setting phase/mode or is rendering previously-saved data. Further a plurality of 7-section monitors is installed on the command box to display all digits related to regulations and registers the changes in a reaction of the elevator mechanism. A graphic LCD monitor is also installed on the command box to display a location of the elevator mechanism in numerical value or percentage.

According to an embodiment herein, the elevator mechanism of the mechanical section further comprises a plurality of parallel rails with grooves, a plurality of moving blocks placed inside grooves of the plurality of parallel rails by a plurality of ball bearings, a flooring connected to a plurality of moving blocks inside the plurality of parallel rails, a lower frame to connect a lower ends of the plurality of parallel rails to the second set of supporting arms, a upper frame with a furrow connected to the upper ends of the plurality of parallel rails, an electromotor placed inside the furrow provided in the upper frame, lower elevator axles connected to the lower ends of the plurality of parallel rails by a plurality of ball bearings, the upper elevator axles connected to the upper ends of the plurality of parallel rails by a plurality of ball bearings, a chain to connect the upper elevator axles to an electromotor shaft with a plurality of cogwheels for enabling the upper elevator axles to move with the movement of the electromotor, a twin chain set placed around the upper elevator axles and the lower elevator axles by a plurality of cogwheels for connecting the upper elevator axles and the lower elevator axles to each other such that the lower elevator axles rotates with the rotation of the upper elevator axles, a clamp for connecting the twin chain set to the flooring in order to move the flooring with the movement of the twin chain set, a twin chain regulation clamp placed between the plurality of parallel rails to regulate a loosening and a tightening of the twin chain set. Further a central support frame is connected to the plurality of parallel rails at the center and suspended to connect the elevator mechanism to the first set of supporting arms. Then a connecting clamp is adopted for connecting a first encoder to one end of the upper elevator axles such that an encoder shaft rotates with the rotation of the upper elevator axles to measure the movement of the elevator mechanism. The first encoder installed in the elevator mechanism measures a clutching rate in the vehicles and transfers an order of clutching to the elevator.

According to an embodiment herein, the clutch pedal lever further comprises a set of supporting arms connected to one end of the plurality of rail support base of mechanical section and placed collaterally against each other such that the set of supporting arms are in the same direction with the plurality of rail support base, a connector lever including a coil of wire screwed inside a vacuum pipe to reduce or increase length of the screw wire and a support base connected to the screw wire of the connector lever and acts as a supporting base for the gas lever.

According to an embodiment herein, the gas lever further comprises a handhold placed underneath the gas pedal, a shaft placed inside a main box, a connector bushing connecting the shaft to the handhold, a spring providing an elastic rotation to the shaft, a rotary encoder connected to the shaft attached to handhold by a fine bushing inside the main box and an encoder support frame connected to the main box through a plurality of bolts.

According to an embodiment herein, a plurality of connector coils are installed inside a plurality of grooves provided on the set of support arms (first set and second set) to regulate a distance between the support arms and the gas pedal of the vehicle. The two sets of support arms are placed at either sides of clutch pedal in the vehicle. The support base is connected to the connecter lever such that the connector lever creates an angle of 90° with the screw wire. The handhold is tightened by a bolt to the end of the shaft to regulate the handhold angle from the gas pedal. By loosening the said bolt, the connection of handhold to shaft is removed and then the angle of the handhold from the gas pedal in the vehicle is regulated. Further a second encoder is installed in the gas lever to measure the functioning of the gas pedal in the vehicles. The first encoder installed in the elevator mechanism and the second encoder installed in the gas pedal are connected to the electronic section of the automatic clutch system.

According to an embodiment herein, the automatic clutch system controls a clutching operation based on a pressure applied on the gas pedal and in proportion to a vehicle speed and through a single regulation of system's electrical circuit.

Figure 22:
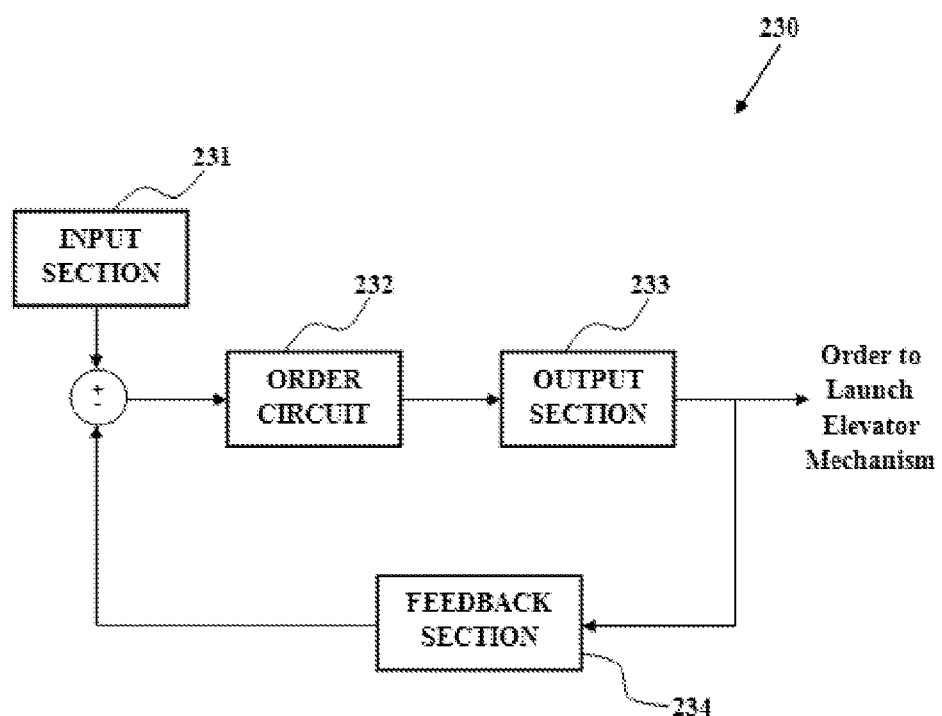
FIG. 22 illustrates a block diagram of an electronic circuit of the automatic clutch system, according to an embodiment herein.

FIG. 1 illustrates a side perspective view of a mechanical section of an automatic clutch system, according to an embodiment herein. The automatic clutch system comprises a mechanical section 100 and an electronic section (as shown in FIG. 22). The mechanical section 100 of the automatic clutch system comprises a rail support base 101 with a rail-shaped ridge 101a installed on the flooring of the vehicle (not shown). A plurality of dynamic parts 102, 103 and 104 are installed on the rail-shaped ridge 101a of the rail support base 101. A first set of supporting arms 105 and a second set of supporting arms 106 are connected to an elevator mechanism 107 which is connected to the clutch pedal of the vehicle. A clutch pedal lever 108 is provided for measuring and receiving the orders from a gas pedal.

The rail support base 101 of the mechanical section 100 of the automatic clutch system is provided with pyramidal ridges on a bottom surface to rigidly fix the rail support base 101 on the floor of the vehicle. The plurality of dynamic parts (102, 103 and 104) are provided with ridges on the bottom surface to fix on the rail-shaped ridge 101a of the rail support base 101 to allow a forward and a backward movement on the rail support base 101. The plurality of dynamic parts 102, 103 and 104 include a first dynamic part 102 to connect the rail support base 101 to the flooring of the vehicle through a plurality of bolts and a second dynamic part 103 and a third dynamic part 104 for supporting the elevator mechanism 107 over the rail support base 101.

One end of the first set of supporting arms 105a are connected to a lower section of the elevator mechanism 107 and other end of the first set of supporting arms 105b are connected to the second dynamic frame 103 to support elevator mechanism 107 over the rail support base 101. Similarly, one end of the second set of supporting arms 106a are connected to the elevator mechanism 107 at the center and the other end of the second set of supporting arms 106b are connected to the third dynamic frame 104 so that the inclination angle of the elevator mechanism 107 is varied against the clutch pedal of the vehicle.

The mechanical section 100 of the automatic clutch system further comprises a clutch pedal lever 108 to measure and receive orders from a gas pedal. The clutch pedal lever 108 comprises a spring-shaped end and the spring-shaped end is placed beneath the gas pedal of the vehicle. When a driver or user presses the gas pedal of the vehicle downward, a second encoder existing in the clutch pedal lever 108 sends a pulse to an electronic section. The electronic section measures the pressure applied on the gas pedal and issues order to a command circuit.

The flooring of the elevator mechanism 107 is connected to the rail support base 101 through the first set of supporting arms 105 and the second dynamic frame 103. The lower elevator axle and the upper elevator axles include a plurality of coils at upper section and lower section of the elevator mechanism 107. The length of the upper elevator axles is bigger than the length of the lower elevator axles such that one end of the upper axles protrudes from the parallel rails enabling the at least one end of the upper elevator axles to connect to the electromotor shaft and other end of the upper elevator axles to connect to the encoder of the elevator mechanism.

Figures 2A, 2B:
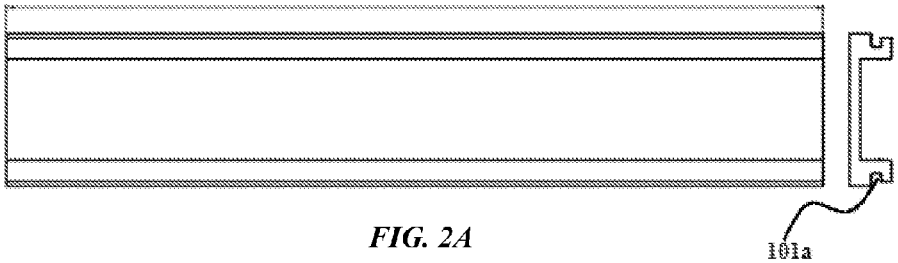
FIG. 2 illustrates a top view of a rail support base of the mechanical section of the automatic clutch system, according to an embodiment herein.

FIG. 2 illustrates a top view of a rail support base of the mechanical section of the automatic clutch system, according to an embodiment herein. The rail support base 101 of the mechanical section 100 of the automatic clutch system is provided with pyramidal ridges on the bottom surface to fix the rail support base 101 rigidly on the floor of the vehicle. The pyramidal ridges on the bottom surface of the rail support base 101 avoid the movement or sliding of the rail support base 101 on the floor of the vehicle. The rail support base 101 supports all constituent parts of the automatic clutch system in the mechanical section 100. The rail support base 100 has a length of 320 mm and a width of 60 mm and is arranged in the form of a rail 101a as shown in FIG. 2. The rail support base 101 helps the dynamic frames of the mechanical section to move or slide on the rail 101a. The rail support base 101 is finally set against the clutch pedal of the vehicle.

FIG. 3A illustrates a side view of a third dynamic part along a length direction of the mechanical section of the automatic clutch system, according to an embodiment herein, while FIG. 3B illustrates a side view of a third dynamic part along a breadth direction in the mechanical section of the automatic clutch system, according to an embodiment herein. FIG. 3C illustrates a side view of a second dynamic part along a length direction of the mechanical section of the automatic clutch system, according to an embodiment herein, while FIG. 3D illustrates a side view of a second dynamic part along a breadth direction of the mechanical section of the automatic clutch system, according to an embodiment herein. FIG. 3E illustrates a side view of a first dynamic part of the mechanical section of the automatic clutch system, according to an embodiment herein, while FIG. 3F illustrates a top view of a first dynamic part of the mechanical section of the automatic clutch system, according to an embodiment herein.

With respect to FIG. 3A-FIG. 3F, the dynamic parts include a first dynamic part 102 to connect the rail support base to the flooring of the vehicle through a plurality of bolts. A second dynamic part 103 and a third dynamic part 104 are provided to supports the elevator mechanism over the rail support base. The dynamic parts 102, 103 and 104 are provided with ridges on the bottom surface to fix the dynamic parts 102, 103 and 104 on the rail-shaped ridge of the rail support base. The ridges allow a forward and a backward movement of the dynamic parts 102, 103 and 104 on the rail support base. The first dynamic part 102 is fixed on the rail support base with two bolts. Then the combination of the first support frame 102 and the rail support base is fixed on the flooring of the vehicle using screws. The first dynamic frame 102 has a length of 85 mm, breath of 12.8 mm the ridge length of 58 mm and a ridge thickness of 4 mm as shown in FIG. 3E and FIG. 3F.

The second dynamic part 103 has a length of 105 mm, breath of 25 mm, ridge length of 60 mm and ridge thickness of 4 mm as shown in FIG. 3C and FIG. 3D. The second dynamic frame 103 is fixed on the rail support base with two bolts. The second dynamic part 103 holds the elevator mechanism 107 at its lower section with the help of first set of support arms.

The third dynamic part 104 has a length of 85 mm, breath of 36 mm, ridge length of 62 mm and a ridge thickness of 4 mm as shown in FIG. 3A and FIG. 3B. The third dynamic part 104 holds the elevator mechanism at its center through a second set of support arms. The third dynamic part 104 is allowed to slide over the rail support base to adjust the elevation angle or inclination angle of the elevator mechanism.

FIG. 4A illustrates a front view of a first set of supporting arms in an elevator mechanism in the mechanical section of the automatic clutch system, according to an embodiment herein, while FIG. 4B illustrates a side view of a first set of supporting arms in an elevator mechanism in the mechanical section of the automatic clutch system, according to an embodiment herein. FIG. 4C illustrates a front view of a second set of supporting arms in an elevator mechanism in the mechanical section of the automatic clutch system, according to an embodiment herein, while FIG. 4D illustrates a side view of a second set of supporting arms in an elevator mechanism in the mechanical section of the automatic clutch system, according to an embodiment herein.

With respect to FIG. 4A-FIG. 4D, the elevator mechanism is connected to the second and third dynamic frames with the first set of support arms 105 and the second set of support arms 106. One end of a first set of support arms 105a is connected to a lower section of the elevator mechanism using two screws and the other end of the first set of supporting arms 105b is connected to the second dynamic frame using two screws to support elevator mechanism over the rail support base. Similarly, one end of the second set of supporting arms 106a are connected to the elevator mechanism at the center with one or more screws and the other end of the second set of supporting arms 106b are connected to the third dynamic frame with one or more screws so that the inclination angle of the elevator mechanism is varied against the clutch pedal of the vehicle. The length of the first set of supporting arms 105 is 120 mm and the length of the second set of supporting arms 106 is 220 mm. The first set of supporting arms 105 are provided with grooves (of 91 mm length and width of 10 mm) along the length to regulate the distance between the elevator mechanism and the flooring of the vehicle by providing the possibility of regulating up and down scales. The second set of supporting arms 106 allows adjusting the placement angle of the elevator mechanism with respect to the clutch pedal of the vehicle.

Figure 5:
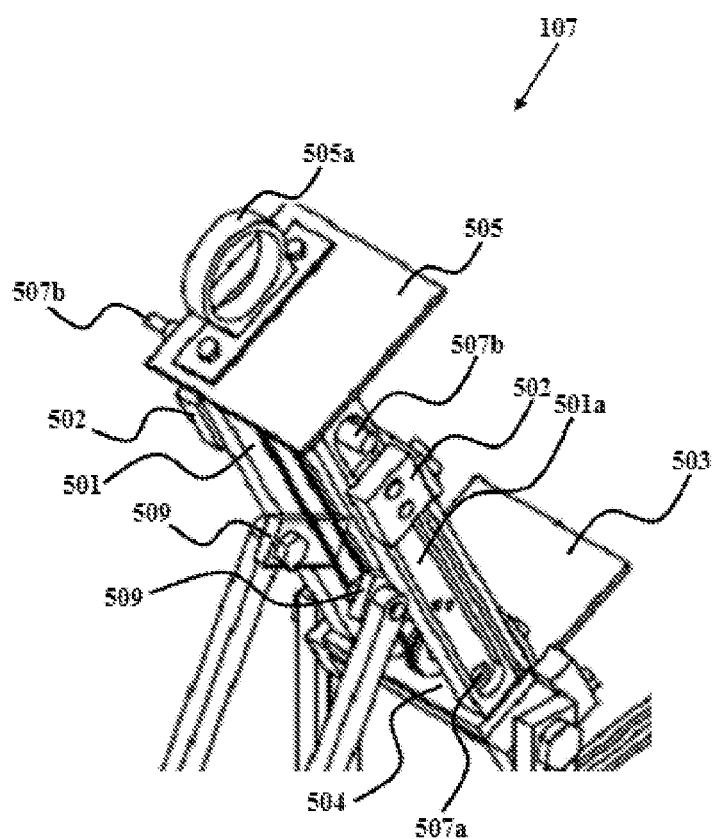
FIG. 5 illustrates a side perspective view of an elevator mechanism in the mechanical section of the automatic clutch system, according to an embodiment herein.

FIG. 5 illustrates a side perspective view of an elevator mechanism in the mechanical section of the automatic clutch system, according to an embodiment herein. The elevator mechanism 107 comprises at least two parallel rails 501 fixed against each other in a vertical and parallel fashion. The set of parallel rails 501 are provided with grooves 501a (with a width of 14 mm and depth of 5 mm) along their length and they are placed in such a way that the grooves 501a on each rail 501 are parallel to each other. Further, a plurality of moving blocks 502 are placed inside the grooves 501a using a plurality of ball bearings. The flooring 503 of the elevator mechanism 107 is set on the clutch pedal of the vehicle such that a movement of the elevation mechanism 107 by an electromotor causes a simultaneous movement of the clutch pedal. The flooring 503 is connected to the plurality of moving blocks 502 and moved up and down with the movement of the plurality of moving blocks 502 inside the plurality of parallel rails 501. A lower frame 504 connects a lower end of the plurality of parallel rails 501 to the first set of supporting arms 105 in a vertical style. An upper frame 505 is provided with a furrow and the upper frame 505 is connected to the upper ends of the plurality of parallel rails 501. An engine support flange 505a is placed inside the furrow provided in the upper frame 505. An electromotor is inserted inside the engine support flange 505a placed inside the furrow provided in the upper frame 505 of the elevator mechanism 500. Further, the two sets of elevator axles 507a and 507b provided with a coil having a diameter of 8 mm in each set are placed on the upper section and lower section of the elevator. The elevator axles 507a and 507b are placed in such a way that, the elevator axles 507a and 507b have a distance of 17 mm from the end sections of the plurality of parallel rails 501. A chain connects the upper elevator axles 507b to the electromotor shaft with one of the cogwheels. A twin chain set is placed around the upper elevator axles 507b and the lower elevator axles 507a through a plurality of cogwheels. The twin chain sets connects the upper elevator axles 507b and the lower elevator axles 507a to each other such that the lower elevator axles 507a rotates with the rotation of the upper elevator axles 507b. A connection clamp connects the twin chains to the flooring 503 in order to move the flooring 503 along with the movement of the twin chain sets. A twin chain regulating clamp is placed between the plurality of parallel rails 501 to regulate a loosening and a tightening of the twin chain sets. The twin chain sets move over this regulating clamp. A central support frame 509 is connected to the plurality of parallel rails 501 at the center. The central support frames 509 are then suspended to connect the elevator mechanism to the second set of supporting arms 106 of the mechanical section. A connection clamp connects a first encoder to at least one end of the upper elevator axles 507b such that a first encoder shaft rotates with the rotation of the upper elevator axles 507b to measure the movement of the elevator mechanism 500.

Figures 6A, 6B:
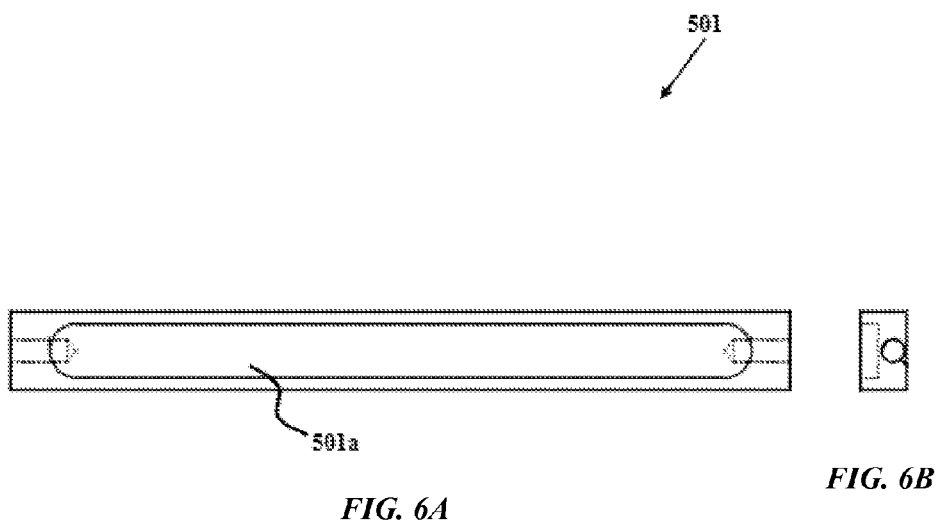
FIG. 6A illustrates a front view of parallel rails of an elevator mechanism in the mechanical section of the automatic clutch system, according to an embodiment herein.
FIG. 6B illustrates a side view of parallel rails of an elevator mechanism in the mechanical section of the automatic clutch system, according to an embodiment herein.

FIG. 6A illustrates a front view of parallel rails of an elevator mechanism in the mechanical section of the automatic clutch system, according to an embodiment herein, while FIG. 6B illustrates a side view of parallel rails of an elevator mechanism in the mechanical section of the automatic clutch system, according to an embodiment herein. With respect to FIG. 6A and FIG. 6B, the elevator mechanism in the mechanical section of the automatic clutch system comprises at least two parallel rails 501. The at least two parallel rails 501 are fixed against each other in a vertical and parallel fashion. The parallel rails 501 are provided with grooves 501a (with a width of 14 mm and depth of 5 mm) along their length and they are placed in such a way that the grooves 501a on each parallel rail 501 are parallel to each other. The length of parallel rails 501 are 200 mm and the length of the grooves 501a provided inside the set of two parallel rails 501 is 180 mm. The width of the parallel rails 501 is 20 mm and thickness is 12 mm. The upper section of the parallel rails 501 is connected to the upper frame 505 of the elevator mechanism with a M6 bolt and the lower section of the parallel rails 501 is connected to the lower frame 504 with a M6 bolt.

FIG. 7A illustrates a front view of moving blocks of the elevator mechanism in the mechanical section of the automatic clutch system, according to an embodiment herein, while FIG. 7B illustrates a side view of the moving blocks of the elevator mechanism in the mechanical section of the automatic clutch system, according to an embodiment herein. With respect to FIG. 7A and FIG. 7B, a plurality of moving blocks 502 are placed inside the grooves provided in the at least two parallel rails by a plurality of ball bearings. These plurality of moving blocks 502 move softly inside the grooves provided in the parallel rails. The plurality of moving blocks 502 is in the form of a rectangular cube with a dimension of 10 mm length, 25 breadth and 30 mm height. The plurality of ball bearings provided is placed along each other such that the distance between each ball bearing is 2 mm.

FIG. 8A illustrates a top view of a flooring of the elevator mechanism in the mechanical section of the automatic clutch system, according to an embodiment herein and FIG. 8B illustrates a side view of a flooring of the elevator mechanism in the mechanical section of the automatic clutch system, according to an embodiment herein, while FIG. 8C illustrates another side view of a flooring of the elevator mechanism in the mechanical section of the automatic clutch system, according to an embodiment herein. With respect to FIG. 8A-FIG. 8C, the flooring 503 of the elevator is set on the clutch pedal of the vehicle. The clutch pedal of the vehicle moves along with the movement of the elevator by the electromotor. The flooring 503 is connected to the plurality of moving blocks to move in an upward direction and downward direction in response to the movement of the plurality of moving blocks inside the plurality of parallel rails. The flooring of the elevator mechanism has a length of 180 mm, thickness of 5 mm and width of 83 mm. The part of the flooring placed on the clutch pedal holds the length of 60 mm and width of 80 mm. The flooring of the elevator mechanism is connected to the moving blocks of the plurality of parallel rails through one or more M6 bolts.

FIG. 9A illustrates a front view of a lower frame of an elevator mechanism in the mechanical section of the automatic clutch system according to an embodiment herein and FIG. 9B and FIG. 9C illustrates side views of a lower frame of an elevator mechanism in the mechanical section of the automatic clutch system, according to an embodiment herein, while FIG. 9D illustrates a top view of a lower frame of an elevator mechanism in the mechanical section of the automatic clutch system, according to an embodiment herein. With respect to FIG. 9A-FIG. 9D, the lower frame 504 of the elevator mechanism connects the lower ends of the plurality of parallel rails 501 to the first set of supporting arms 105 in a vertical style. The first set of supporting arms are placed in the adjacent section of the lower frame 504 and are connected to the lower frame 504 through M10 bolts. The pluralities of parallel rails 501 are placed with a distance of 53 mm from each other. These pluralities of parallel rails 501 are connected to the lower frame 504 by R4 and R2 screws. The lower frame 504 has a length of 102 mm and width of 30 mm.

FIG. 10A illustrates a top view of an upper frame of an elevator mechanism in the mechanical section of the automatic clutch system, according to an embodiment herein and FIG. 10B illustrate a side view of an upper frame of an elevator mechanism in the mechanical section of the automatic clutch system, according to an embodiment herein. FIG. 10C illustrates a side view of a furrow in an upper frame of an elevator mechanism in the mechanical section of the automatic clutch system, according to an embodiment herein, while FIG. 10D illustrates a top view of a furrow in an upper frame of an elevator mechanism in the mechanical section of the automatic clutch system, according to an embodiment herein. With respect to FIG. 10A-FIG. 10D, the upper frame 505 is provided with a furrow and the upper frame 505 is connected to the upper ends of the plurality of parallel rails. An engine support flange 505a is placed inside the furrow provided in the upper frame 505. This engine support flange 505a regulates the change in place of the electromotor over the plurality of parallel rails through the grooves existing on the plurality of parallel rails. The upper frame 505 is connected to the upper ends of the plurality of parallel rails by one or more bolts. The upper frame 505 has a length of 80 mm and width of 30 mm.

The elevator mechanism of the mechanical section of the automatic clutch system further comprises an electromotor. The electromotor is placed inside the engine support flange 505a placed inside the furrow provided in the upper frame 505 of the elevator mechanism. Then an electromotor shaft is connected to an upper axle of the elevator. The electromotor is placed in such a way that the electromotor shaft and the upper axle of the elevator are aligned along a common axis.

Figure 11A:
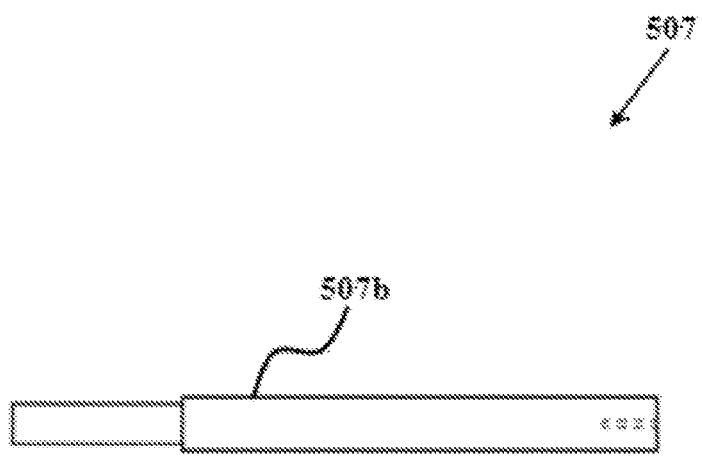
FIG. 11A illustrates a side view of an upper elevator axle in an elevator mechanism at the mechanical section of the automatic clutch system, according to an embodiment herein.
Figure 11B:
FIG. 11B illustrates a side view of a lower elevator axle in an elevator mechanism at the mechanical section of the automatic clutch system, according to an embodiment herein.

FIG. 11A illustrates a side view of an upper elevator axle in an elevator mechanism at the mechanical section of the automatic clutch system, according to an embodiment herein while FIG. 11B illustrates a side view of a lower elevator axle in an elevator mechanism at the mechanical section of the automatic clutch system, according to an embodiment herein. With respect to FIG. 11A and FIG. 11B, the elevator mechanism includes two elevator axles 507a and 507b with each axle including a coil with the diameter of 8 mm placed on the upper section and lower section of the elevator. The elevator axles 507a and 507b are placed in such a way that, the elevator axles 507a and 507b have a distance of 17 mm from the two end sections of the plurality of parallel rails 501. The elevator axles 507a and 507b includes lower elevator axles 507a and upper elevator axles 507b. The lower elevator axles 507a are connected to the lower ends of the plurality of parallel rails by a plurality of ball bearings with the thickness of 14 mm and the upper elevator axles 507b are connected to the upper ends of the plurality of parallel rails by a plurality of ball bearings with the thickness of 14 mm. The pluralities of parallel rails are connected to each other by the upper elevator axles 507b and lower elevator axles 507a.

The lower elevator axles 507a have a length of 70 mm and the upper elevator axles 507b have a length of 95 mm. The length of the upper elevator axles 507b is more than that of the lower elevator axles 507a such that in placing the upper elevator axle 507b among the plurality of parallel rails, one end of the upper elevator axles 507b protrudes by 25 mm from the plurality of parallel rails. The protrusion of the one end of the upper elevator axles 507b enables the upper elevator axles 507b to connect to the electromotor shaft placed in the parallel style. Another end of the upper elevator axles 507b is finally connected to an encoder existing in the elevator. The width of the upper elevator axles 507b and the lower elevator axles 507a is 8 mm. The width of protruded end of the upper elevator axles 507b is 6 mm.

Further a chain is adopted in the elevator mechanism to connect the upper elevator axles 507b to the electromotor shaft with one of the cogwheels. The elevator mechanism of the automatic clutch system comprises two cogwheels. Each cogwheel is composed of 10 cogs to enable the upper elevator axles 507b to move with the movement of the electromotor. Another cogwheel is connected to the protruded end of the upper elevator axles 507b from the plurality of parallel rails. Finally both the cogwheels are placed in the same direction and are joined to each other by the chain.

The elevator mechanism of the automatic clutch system further comprises a twin chain set placed around the upper elevator axles 507b and the lower elevator axles 507a by a plurality of cogwheels. The twin chain set connects the upper elevator axles 507b and the lower elevator axles 507a to each other such that the lower elevator axles 507a rotate along with the rotation of the upper elevator axles 507b. The twin chains set have a length of 180 mm. The twin chain set is placed in the same direction and parallel to each other in between the plurality of parallel rails. The distance between the twin chains set is equal to 10 mm and distance of each chain from the side rail is equal to 18 mm.

FIG. 12A illustrates a top view of a connection clamp of the mechanical section of the automatic clutch system, according to an embodiment herein, while FIG. 12B illustrates a side view of a connection clamp of the mechanical section of the automatic clutch system, according to an embodiment herein. With respect to FIG. 12A and FIG. 12 B, the connection clamp 131 is adopted to connect a twin chain set to the flooring in order to move the flooring with the movement of the twin chain set.

Figure 13A:
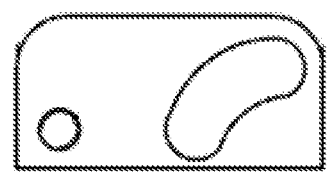
FIG. 13A illustrates a top view of a twin chains regulating clamp in an elevator mechanism at the mechanical section of the automatic clutch system, according to an embodiment herein.
Figure 13B:
FIG. 13B illustrates a side view of a twin chains regulating clamp in an elevator mechanism at the mechanical section of the automatic clutch system, according to an embodiment herein.
Figure 13C:
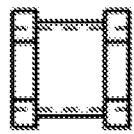
FIG. 13C illustrates a side view of a bolt in a twin chains regulating clamp in an elevator mechanism at the mechanical section of the automatic clutch system, according to an embodiment herein.
Figure 13D:
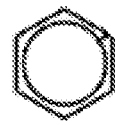
FIG. 13D illustrates a front view of a bolt in a twin chains regulating clamp in an elevator mechanism at the mechanical section of the automatic clutch system, according to an embodiment herein.
Figure 13E:
FIG. 13E illustrates a side view of a chain in a twin chains regulating clamp in an elevator mechanism at the mechanical section of the automatic clutch system, according to an embodiment herein.

FIG. 13A illustrates a top view of a twin chains regulating clamp in an elevator mechanism at the mechanical section of the automatic clutch system, according to an embodiment herein, while FIG. 13B illustrates a side view of a twin chains regulating clamp in an elevator mechanism at the mechanical section of the automatic clutch system, according to an embodiment herein. FIG. 13C illustrates a side view of a bolt in a twin chains regulating clamp in an elevator mechanism at the mechanical section of the automatic clutch system, according to an embodiment herein, while FIG. 13D illustrates a front view of a bolt in a twin chains regulating clamp in an elevator mechanism at the mechanical section of the automatic clutch system, according to an embodiment herein. FIG. 13E illustrates a side view of a chain in a twin chains regulating clamp in an elevator mechanism at the mechanical section of the automatic clutch system, according to an embodiment herein. With respect to FIG. 13A-FIG. 13E, the twin chain regulation clamp 141 is placed among the plurality of parallel rails to regulate softness and tightness of the twin chain sets. The twin chain sets move over the regulating clamp 141. The regulating clamp 141 regulates the softness and tightness of the twin chain sets by opening and closing the regulating clamp 141. The twin chains regulating clamp 141 comprises one or more bolts, to ensure the softness and tightness of the twin chain set.

Figure 14A:
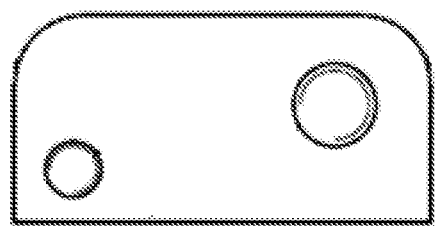
FIG. 14A illustrates a top view of a central support frame in an elevator mechanism at the mechanical section of the automatic clutch system, according to an embodiment herein.
Figure 14B:
FIG. 14B illustrates a side view of a central support frame in an elevator mechanism at the mechanical section of the automatic clutch system, according to an embodiment herein.

FIG. 14 A illustrates a top view of a central support frame in an elevator mechanism at the mechanical section of the automatic clutch system, according to an embodiment herein, while FIG. 14 B illustrates a side view of a central support frame in an elevator mechanism at the mechanical section of the automatic clutch system, according to an embodiment herein. With respect to FIG. 14A and FIG. 14B, the central support frames 509 are connected to the plurality of parallel rails at the center. The central support frames 509 are then suspended to connect the elevator mechanism to the second set of supporting arms. The central support frames 509 connected to the plurality of parallel rails at the center have a length and a width of 20 mm each. The central support frames 509 are further connected to an inner frame of the plurality of the parallel rails through one or more bolts, such that the central support frames 509 are set against each other in the inner frame of a plurality of the parallel rails.

The central support frames 509 suspended to connect the elevator mechanism to the second set of supporting arms are protruded from the plurality of parallel rails in order to avoid a contact of the second set of supporting arms with the plurality of parallel rails at the time of connecting the second set of supporting arms to the plurality of parallel rails. The second set of supporting arms is connected to the central support frames 509 through bolts.

FIG. 15A illustrates a top view of a connecting clamp for an encoder in an elevator mechanism at the mechanical section of the automatic clutch system, according to an embodiment herein while FIG. 15B illustrates a side view of a connecting clamp for an encoder in an elevator mechanism at the mechanical section of the automatic clutch system, according to an embodiment herein. With respect to FIG. 15A and FIG. 15B, the connecting clamp connects a first encoder to one end of the upper elevator axles such that a first encoder shaft rotates with the rotation of the upper elevator axles to measure the movement of the elevator mechanism. The first encoder is a 360 pulse encoder with a diameter of 20 mm. The first encoder installed in the elevator mechanism measures a clutching rate in the vehicles and transfers an order of clutching to the elevator mechanism.

Figure 16:
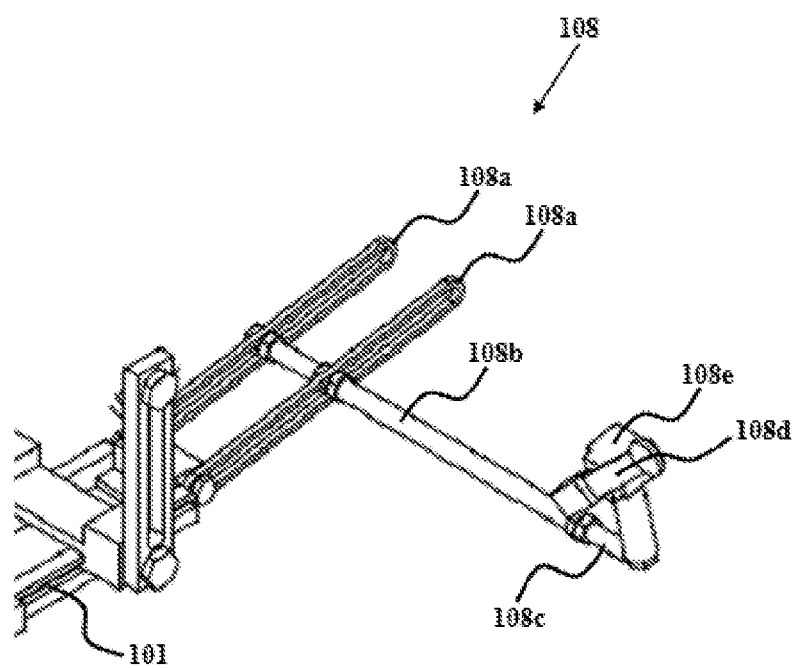
FIG. 16 illustrates a side perspective view of a clutch pedal lever assembly of an elevator mechanism of the mechanical section of the automatic clutch system, according to an embodiment herein.

FIG. 16 illustrates a side perspective view of a clutch pedal lever assembly of an elevator mechanism of the mechanical section of the automatic clutch system, according to an embodiment herein. The clutch pedal lever assembly 108 comprises a set of support arms 108a connected to one end of the plurality of rail support base 101 of mechanical section and placed collaterally against each other such that the set of supporting arms 108a are in the same direction with the plurality of rail support base 101. A connector lever 108b includes a coil of wire screwed inside a vacuum pipe to reduce or increase a length of the screw wire. A support base 108c connected to the coil of wire of the connector lever 108b and the support base 108c acts as a supporting base for the gas lever. The gas lever further comprises a handhold 108d, a shaft, a spring, a main box, a connector bushing, a rotary encoder and an encoder support frame 108e. The handhold of the gas lever is placed under the gas pedal and the handhold is connected to a shaft.

Figure 17A:
FIG. 17A illustrates a front view of support arms of a clutch pedal lever assembly of an elevator mechanism in the mechanical section of the automatic clutch system, according to an embodiment herein.
Figure 17B:
FIG. 17B illustrates a side view of support arms of a clutch pedal lever assembly of an elevator mechanism in the mechanical section of the automatic clutch system, according to an embodiment herein.

FIG. 17A illustrates a front view of the support arms of a clutch pedal lever assembly of an elevator mechanism in the mechanical section of the automatic clutch system, according to an embodiment herein, while FIG. 17B illustrates a side view of the support arms of a clutch pedal lever assembly of an elevator mechanism in the mechanical section of the automatic clutch system, according to an embodiment herein. With respect to FIG. 17A and FIG. 17B, the clutch pedal lever assembly measures and receives orders from a gas pedal. The clutch pedal lever comprises a spring-like end and the spring-like end is placed beneath the gas pedal of the vehicle. When a driver or user presses the gas pedal of the vehicle downward, a second encoder existing in the clutch pedal lever sends a pulse to an electronic section. The electronic section measures the pressure applied on the gas pedal and issues order to a command circuit.

The clutch pedal lever further comprises a set of support arms 108a. The set of support arms 108a are connected to one end of the plurality of rail support base of mechanical section and placed collaterally against each other such that the set of supporting arms 108a are in the same direction with the plurality of rail support base. The set of support arms 108a are provided with grooves with the length of 160 mm. A connector coil is inserted inside the grooves of the set of support arms 108a. These grooves enable the connector coil to regulate the distance of a connector coil from the gas pedal. The set of support arms 108a are then placed at the two sides of the clutch pedal such that when the clutch pedal is pressed to the end, the set of support arms 108a are placed alongside the clutch pedal at both the sides of the clutch pedal.

FIG. 18A illustrates a front side view of a vacuum pipe along in a connector lever of a clutch pedal lever in an elevator mechanism at the mechanical section of the automatic clutch system, according to an embodiment herein and FIG. 18B illustrates a side view of a vacuum pipe in a connector lever of a clutch pedal lever in an elevator mechanism at the mechanical section of the automatic clutch system, according to an embodiment herein, while FIG. 18C illustrates a side view of a coil in a connector lever of a clutch pedal lever in an elevator mechanism at the mechanical section of the automatic clutch system, according to an embodiment herein. With respect to FIG. 18A-FIG. 18C, the connector lever 108b includes a coil of wire screwed inside a vacuum pipe to reduce or increase the length of the screw wire. The connector lever 108b is composed of a vacuum pipe with the diameter of 10 mm and length of 165 mm and the coil of wire with the length of 70 mm. The coil of wire is placed inside the vacuum pipe from one end of the vacuum pipe and is screwed inside the vacuum pipe. The coil of wire is screwed inside the vacuum pipe to increase or decrease the length of the coil of wire. Another end of the vacuum pipe is connected by a bolt with the length of 6.5 mm to the support arms 108a and tightened.

Figure 19A:
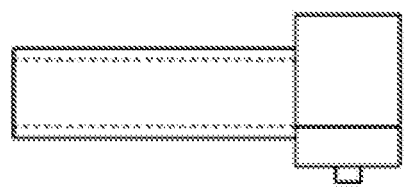
FIG. 19A illustrates a front side view of a leg in a support base of a clutch pedal lever of an elevator mechanism in the mechanical section of the automatic clutch system, according to an embodiment herein.
Figure 19B:
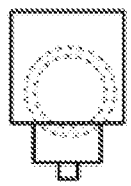
FIG. 19B illustrates a side view of a leg in a support base of a clutch pedal lever of an elevator mechanism in the mechanical section of the automatic clutch system, according to an embodiment herein.
Figure 19C:
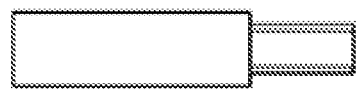
FIG. 19C illustrates a side view of a screw wire connector in a support base of a clutch pedal lever of an elevator mechanism in the mechanical section of the automatic clutch system, according to an embodiment herein.

FIG. 19A illustrates a front side view of a leg in a support base of a clutch pedal lever of an elevator mechanism in the mechanical section of the automatic clutch system, according to an embodiment herein and FIG. 19B illustrates a side view of a leg in a support base of a clutch pedal lever of an elevator mechanism in the mechanical section of the automatic clutch system, according to an embodiment herein, while FIG. 19C illustrates a side view of a screw wire connector in a support base of a clutch pedal lever of an elevator mechanism in the mechanical section of the automatic clutch system, according to an embodiment herein. With respect to FIG. 19A-FIG. 19C, the support base 108c is connected to the coil of wire of the connector lever and the support base 108c acts as a supporting base for the gas lever. The support base 108c has an ability of opening, folding and changing the size, such that the support base 108c can have lengths from 50 to 90 mm. Diameter of this support base 108c is equal to 16 mm and wire placed inside this support base 108c has a diameter of 8 mm. The structure of the support base 108c is like a connector lever with the only difference in that being the connector lever needs a screwing for opening and folding but the support base 108c is designed so that there is no need for a screwing and it is opened and folded in a drawer style. The support base 108c of the gas lever is finally connected to the coil of wire of the connector lever and plays role of a support base for the gas lever. The support base 108c is connected to the connecter lever such that it creates an angle of 90° with the coil of wire.

Figure 20A:
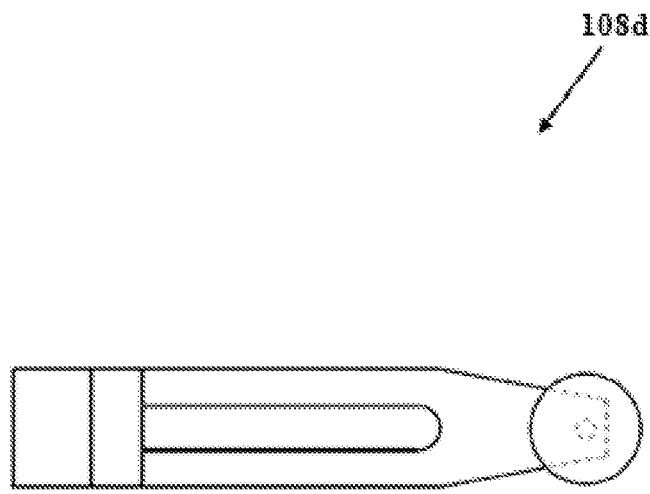
FIG. 20A illustrates a top view of a handhold of a gas lever of an elevator mechanism in the mechanical section of the automatic clutch system, according to an embodiment herein.
Figure 20B:
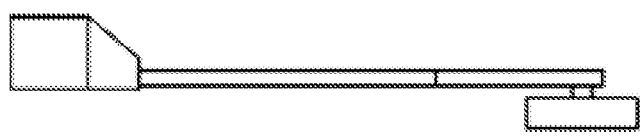
FIG. 20B illustrates a side view of a handhold of a gas lever of an elevator mechanism in the mechanical section of the automatic clutch system, according to an embodiment herein.

FIG. 20A illustrates a top view of a handhold of a gas lever of an elevator mechanism in the mechanical section of the automatic clutch system, according to an embodiment herein while FIG. 20B illustrates a side view of a handhold of a gas lever of an elevator mechanism in the mechanical section of the automatic clutch system, according to an embodiment herein. With respect to FIG. 20 A-FIG. 20B, the gas lever further comprises a handhold 108d, a shaft, a spring, a main box, a connector bushing, a rotary encoder and an encoder support frame. The handhold 108d of the gas lever is placed under the gas pedal and the handhold 108d is connected to a shaft. The shaft is inserted inside the main box with smaller dimensions. The main box connects the shaft attached to the handhold 108d by the connector bushing to the rotary encoder. The encoder support frame 108e is placed around the rotary encoder connected to main box such that the end of the rotary encoder is placed alongside and opposite to the end of shaft connected to handhold 108d. The rotary encoder, the handhold 108d and the shaft are connected to each other through the connector bushing. With the movement of the handhold 108d from down to top, the shaft inside the main box starts rotating and generates pulse.

The handhold 108d of the gas lever has a length of 95 mm and the handhold 108d is placed underneath the gas pedal. This handhold 108d is tightened by a bolt to the end of the shaft to regulate the angle from the gas pedal such that upon loosing the bolt, the connection of the handhold 108d to the shaft is removed to regulate the angle of the handhold 108d from the gas pedal.

The shaft connected to the handhold 108d is entitled with a length of 20 mm and diameter of 3 mm. Further a spring is provided in the main box. The spring provides the shaft with the possibility of elastic rotation and to return to its previous place after rotation to any direction. The main box in the gas lever has a length of 30 mm, width of 20 mm and height of 20 mm. The end sections of the handhold's 108d shaft and rotary encoder are joined to each other.

Figure 21A:
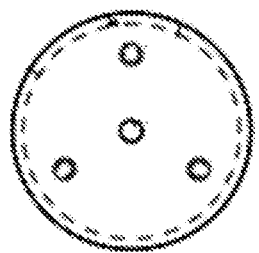
FIG. 21A illustrates a front view of an encoder support frame of a gas lever of an elevator mechanism in the mechanical section of the automatic clutch system, according to an embodiment herein.
Figure 21B:
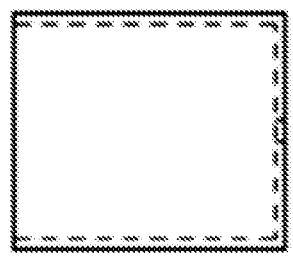
FIG. 21B illustrates a side view of an encoder support frame of a gas lever of an elevator mechanism in the mechanical section of the automatic clutch system, according to an embodiment herein.

FIG. 21A illustrates a front view of an encoder support frame of a gas lever of an elevator mechanism in the mechanical section of the automatic clutch system, according to an embodiment herein, while FIG. 21B illustrates a side view of an encoder support frame of a gas lever of an elevator mechanism in the mechanical section of the automatic clutch system, according to an embodiment herein. With respect to FIG. 21A-FIG. 21B, the encoder support frame 108e is a circular frame with an external diameter of 25 mm and internal diameter of 20 mm. The encoder support frame 108e is placed around the rotary encoder connected to main box such that the end of the rotary encoder is placed alongside and opposite of the end of shaft connected to handhold 108d. The encoder support frame 108e is finally connected to the main box by a plurality of bolts.

FIG. 22 illustrates a block diagram of an electronic section of the automatic clutch system, according to an embodiment herein. The electronic section 230 of the automatic clutch system comprises an input section 231, an order/command circuit 232, an exit/output section 233, a feedback circuit 234, a plurality of monitors and a circuit connected to car's speed sensors. The input section 231 includes a keyboard for regulating the system by the user or driver of the vehicle and order/command transmission resources for placing the clutch lever in a due place. The keyboard of the electronic section 230 enables the user or driver of the vehicle to exercise the required regulations including the oscillation speed of the elevator mechanism, setting favorite points for placing the elevator mechanism and regulating the reaction times of the elevator mechanism. The order/command transmission resources in the input section 231 of the electronic section 230 of the automatic clutch system include three order/command transmission resources. The processor then sends a reaction order/command to the output section 233 depending on reception of at least any one of three order/command transmission resources.

A first order/command transmission resource to the clutch pedal lever is the gas pedal, which rotates around an axle and is connected to a secondary system. At the side of the gas lever there is the rotary encoder that generates 360 pulses in each rotation. The rate of change of angle of the elevator mechanism is reported to the processor through pulses generated by the rotary encoder and processor sends the required order/command to the output section 233. The second and third resources are two switches (first switch and second switch) that with the activation of each switch, the clutch pedal lever enter a default state for each switch.

The first switch is used for changing the gear while driving, resulting in putting the elevator mechanism in the endmost position. Upon pressing the first switch, the gas pedal is pressed to the end allowing a gear change action. Similarly, upon releasing the first switch, the elevator mechanism and the clutch pedal return to the previous state. Finally, the first switch is installed on a speed gear knob of vehicles. According to one embodiment herein, the first switch is temporarily installed on the command box in the electronic section of the automatic clutch system.

The second switch is adopted for elevating the clutch pedal lever. Upon pressing the second switch, the elevator mechanism and the clutch pedal lever enters the most possible primary state of lifting the clutch pedal lever upside. When the vehicle is completely stopped, the automatic clutch system leads the clutch pedal lever to the lowest position. For avoiding damage on car's (clutch) disk while the vehicle is stopped for a long time with the running engine, the second switch can avoid or prevent a placement of the clutch pedal lever in the endmost position. Finally, the second switch is installed on the steering wheel of the vehicle or on an end of vehicle's speed gear. According to one embodiment herein, the second switch is temporarily installed on the command box in the electronic section 230 of the automatic clutch system.

The order/command circuit 232 includes a command box to receive data from entries, send order/command to output section 233, investigating the output reaction in the feedback circuit 234 and representing all occurred reactions and regulations on the plurality of monitors. The order/command circuit 232 is composed of a microcontroller to which all output sections 233 and input sections 231, samplers (feedback circuits 234) and plurality of monitors are attached.

The output section 233 changes the linear position of the elevator mechanism according to the received data. These changes are made by a DC motor which converts an electrical energy into a mechanical energy and changes the position of the elevator mechanism by rotating. The DC motor used in this system is 12V and a momentary current required by the DC motor is 5 A while a permanent current needed is 3 A. For meeting the current used by the DC motor, an L6203 Driver is used.

The feedback circuit 234 or output sampler reports an output status from the output section 233 to the order/command circuit 232 in order to assess a true practice of orders/commands by processor and to ensure resistance of the automatic clutch system. For the stability of the automatic clutch system, the output status in the input section 231 needs to be reported all the time in order to determine and eliminate the errors through an error controller by comparing the output status with the desired rate. The rotary encoder is used in the feedback circuit 234 that can generate 100 pulses in every rotation. The axle of the rotary encoder is in a direct relation with the DC motors axle and with every rotation of the DC motor axle, axle of the rotary encoder also rotates once. By processing the pulses generated by the microcontroller, the exact details concerning the position of elevator mechanism is calculated to ensure the stability of the system.

The status of inputs, outputs, feedbacks and general alignments are represented on the plurality of monitors to enable user or driver of the vehicle for desired functioning. The pluralities of monitors are divided into 7-section monitors and LCD graphic monitors. All digits related to regulations and registers changed with the reaction of elevator mechanism are represented on 7-section monitors. Similarly, a LCD graphic monitor represents the location of elevator mechanism in numerical percentage besides displaying/representing a moving direction of the elevator mechanism.

The automatic clutch system is designed so that it needs speed sensors for clutching action. The automatic clutch system performs the clutching operation in two states. In the first state, the vehicle is in gear 1 and the car starts to move (speed from zero until when user want to change gear to 2) and in second state the user change gear from 1 to 2 and vehicle's speed raises (speed from that of when the user change the gear to 2 and thence speeds). For this purpose, a circuit is attached to the plurality of speed sensors and transfers speed to the main circuit of the automatic clutch system.

According to one embodiment herein, the plurality of sensors of vehicles have three legs including main base, two land and exit legs that generate pulse through circular rotation over its exit leg. The sensor shaft is connected to exit shaft of gearbox such that the pulses are generated over the exit leg of sensor along with the rotation of shaft. These kinds of sensors generate 8 pulses in every circular rotation over exit leg. To determine the vehicle's speed from the exit leg of sensor, a pulse counter is provided. The microcontroller installed on this circuit counts pulses per second and it will distinguish a speed of the vehicle based on the number/quantity of pulses.

Experimentally, one can say that every 7 pulses generated by the exit leg of the sensor will represent 1 km speed/hr. The exit leg of the sensor holds two wires, one of which is connected to ICU and the other to a km screen inside the vehicle. The exit leg is connected to a circuit both from the km screen and ICU to the circuit. The circuit attached to the speed sensor is attached to an LCD which will finally be set over by the command box of the automatic clutch system. The actual speed of the vehicle is represented in the LCD in the first line and the mean speed is represented in the second line.

According to one embodiment herein, when the vehicle reaches the considered speed or surpasses it, a relay installed in the circuit is activated and triggers its exit point functions.

According to one embodiment herein, whenever a speed is less than the predetermined speed, the relay comes to the off state (in this time, clutch pedal is pulled down by the system) and, vice versa. When a speed exceeds the predetermined speed, the relay comes to the on state (in this situation, clutch pedal is pulled up by the system).

According to one embodiment herein, two micro-switches are installed over the command circuit connected to the speed sensors for regulating the considered speed. The considered speed refers to the speed in which the user or driver changes the gear from 1 to 2. Finally, the circuit connected to the speed sensor is connected to the main circuit of the automatic clutch system for transmitting the orders related to the vehicle's speed to main circuit.

According to the embodiments herein, the installation and launching of the automatic clutch system includes the following steps: Firstly, the flooring of the elevator mechanism of the system is put across the clutch pedal lever. Then the placement, space and angle of the automatic clutch system are regulated with respect to the considered clutch pedal. The due placement of the system against the clutch pedal and the best possible state are determined and then the automatic clutch system is tightened by attaching the automatic clutch system to the vehicle's flooring. For doing so, the best place is chosen first for boring vehicle's floor and then the automatic clutch system is attached to the vehicle's flooring. The automatic clutch system of the present invention is installed in different places in the vehicle's flooring, i.e. user or driver may have enough space to generate holes to fix the automatic clutch system on the flooring of the vehicle.

After installing the automatic clutch system to the flooring of the vehicle, the placing of gas lever is regulated in such a manner that the support base of the gas lever is placed between gas pedal and brake pedals. This action is done in a way that at the time of pressing the gas pedal and a brake pedal, the foot of the user or driver should not touch the automatic clutch system. This section of system is designed such that the gas lever can be placed in the best place.

Finally, the angle and the distance of the gas lever handhold from the gas pedal are adjusted. The head of the gas lever's handhold is put underneath the gas pedal so as to move down the gas lever's handhold with a minimum pressure applied on the gas pedal.

After the final installation of the automatic clutch system to car pedals, an electrical circuit of the system is regulated. To do so, sockets of DC motor, gas encoder, clutch encoder, electricity cable, and cable connected to the speed sensor are attached to the backside of the steering wheel of the vehicle.

After the complete installation, the automatic clutch system is activated and the required regulations on clutch pedal are performed. Since clutch pedals vary from one vehicle to another, different clutching parameters are considered for the automatic clutch system thereby enabling to regulate the automatic clutch system according to the clutch pedal.

In some vehicles, the clutch functions at a lower distance from the vehicle's floor while in some others the distance between the clutch pedal and the flooring is higher. Furthermore, the hardness of clutch pedals is different in different types of vehicles. Even a movement style of the clutch pedal from up to down is different for different types of vehicles. The automatic clutch system disclosed in the embodiments herein can be adjusted for all possible situations.

Over the steering wheel of the automatic clutch system, 13 segments are installed. Each of these segments is related to a special part of regulations so that, the automatic clutch system will become ready to function after the regulation of different parameters and storage of available data.

Figure 23:
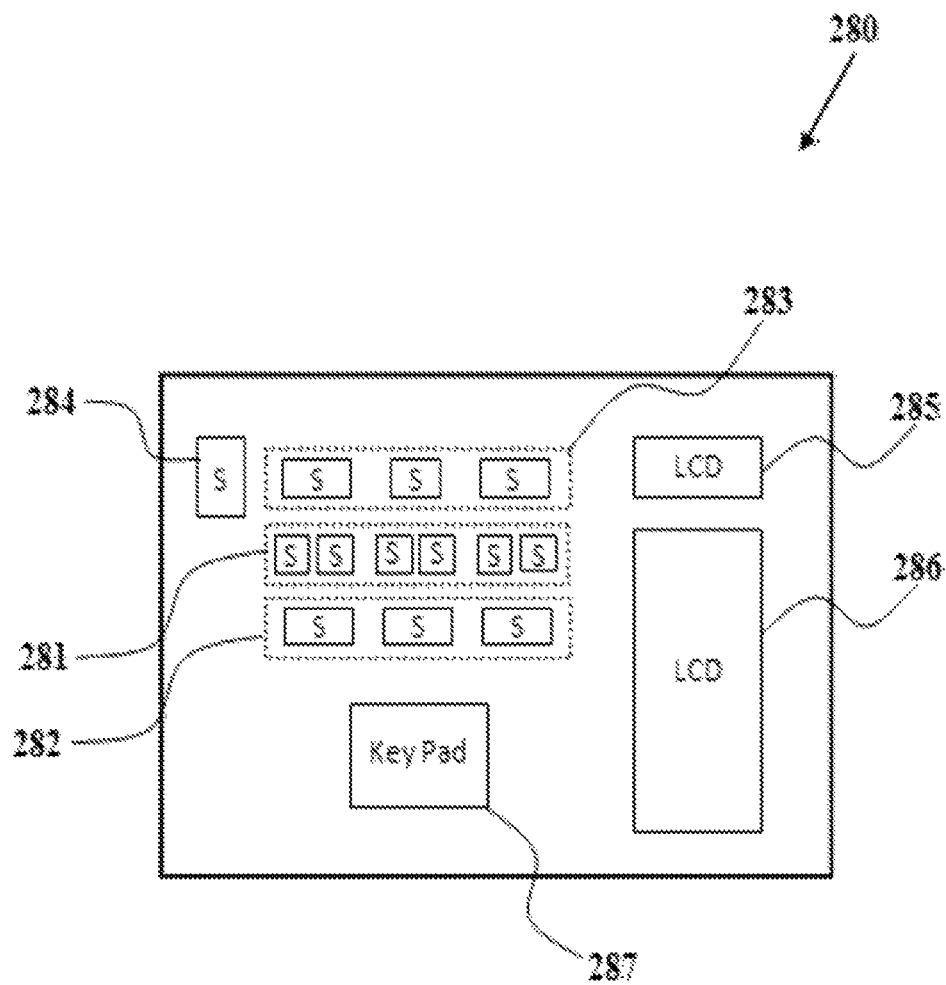
FIG. 23 illustrates a block diagram for a command box in an electronic circuit of the automatic clutch system, according to an embodiment herein.

FIG. 23 illustrates a block circuit diagram for a command box of an electronic section of the automatic clutch system, according to an embodiment herein. The command box receives data from entries, send order/command to output section, investigate the output reaction in the feedback circuit and represent all occurred reactions and regulations on the plurality of monitors. The order/command circuit is composed of a microcontroller to which all output section and input sections, samplers (feedback circuits) and plurality of monitors are attached.

There are 13 digital LCDs on the command box 280 of the system. Each of the LCDs is used for regulating a determinate part of the automatic clutch system. These 13 LCDs are placed in three rows on command box as shown in FIG. 23.

Six single-digits LCDs 281 divided to 3 sets. Each set is used to display oscillation speed of elevator mechanism in different states. These 3 sets of LCD are arranged in middle row as shown in FIG. 23.

Three 3-digits LCDs 282 are placed in the lower row for displaying the position of the elevator mechanism and for determining primary and secondary position of the elevator mechanism. The LCD arranged at the center/middle in the lower row displays/represents a place/location of elevator mechanism in each point of encoder installed on it and the LCDs provided at the two sides in the lower row display/represent primary and secondary places of elevator mechanism which are adjustable. The primary and secondary places represent/indicate the clutching action of the automatic clutch system. The primary and secondary places of the elevator mechanism are primarily registered in the command circuit.

Also, there are two 3-digits placed at the ends and one 2-digit LCDs 283 is placed in the middle between the two 3-digit LCD in the 1st row. The 3-digit LCD represents/displays a movement rate of gas lever and its angle change while the 2-digit LCD represents/displays a coefficient of gas lever. The other 3-digit LCD represents/displays the running hours of the system. When the gas lever moves downward, in proportion to the considered clutch pedal, the clutch pedal also moves upward such that the digit generated by gas lever (rate of output pulse of encoder) is multiplied to a special number and is sent to elevator mechanism and elevator mechanism issues the required order/command for the movement of the clutch pedal. This command is sent to a command system, for instance, to have a determinate upward move when gas pedal has a 1 cm downward move.

A single-digit LCD 284 is placed in the corner of the command box. The size of the single-digit LCD 284 is more than that of the other LCDs. The command circuit designed for this system is adapted to save different clutching states in different vehicles for further applications. This single-digit LCD 284 represents/displays an executive data in numerals/digits.

Further the two LCDs 285, 286 are placed on the command box so that one LCD 285 has dimensions of 25×72 mm while the other LCD 286 has a size of 130×72 mm. The bigger LCD 286 represents/displays an upward or downward moving direction of the clutch pedal. It also represents/displays upward or downward movement rate of the clutch pedal in numerical percentage style. The small LCD 285 is connected to a speed sensor to represent/display the vehicle's speed and the speed required for a gear change from 1 to 2. On the LCD, the required speed is regulated by 2 micro-switches set beside it.

A key pad 287 is provided on the command box 280 for regulating and changing the data as shown in FIG. 23. Its functioning is such that with the pressing and holding operation of a set key for 3 seconds, the automatic clutch system leaves the circuit and enters a regulations state. In this situation, the first LCD 281 starts flashing. Upon entering the considered data and pressing the enter key, the next LCD 282 starts flashing and by doing so, the user or driver may enter the required data for the considered clutch pedal to the system. In the final step of setting operation, the single LCD 284 placed in the corner of the command box 280 starts flashing and in this stage, the user or driver may enter the data by saving the digit into it. For instance, if the series of data for digit 1 is saved, then user or driver should save the next series of data on digit 2 or another digit because the new data will replace the old data omitting the latter when the data is saved on the same digit. When the user or driver wants to play the previously saved data series, the user or driver should press and hold the enter key for 3 seconds until when the single-digit LCD 281 starts flashing. In this situation, only the single digit LCD 281 at the corner of the command circuit will flash. Then, by entering the considered digit saved previously and pressing the enter key, the user may play the desired series of data.

When the command box of the automatic clutch system is in the setting phase or is rendering previously-saved data, the automatic clutch system leaves the circuit and stops functioning. For this purpose and for starting the automatic clutch system, the user should exit the settings menu.

According to the embodiments herein, when automatic clutch system is installed in its place and the vehicle is fully stopped, the clutch pedal is completely lead down by the automatic clutch system. In this situation, the pressing of gas pedal makes the encoder installed on gas pedal's lever to generate a pulse. The higher is the pressure applied on gas pedal the more will be the quantity of the pulses generated such that the encoder generates 1 pulse with each degree of downward movement of the lever.

The pulse generated by gas lever is processed in the command circuit and is multiplied to a number determined in advance by the operator on the command box. The achieved number is sent to the elevator mechanism and in proportion to the increased pressure applied on gas pedal, the clutch pedal moves upward. By releasing the gas pedal, the clutch pedal returns to its previous state and settles in the endmost point assigned for it.

This situation lasts until when the user drives in gear one and in a determinate speed. For instance, when the speed of the vehicle reaches the point on which the user need to change a gear from 1 to 2 (required speed), the elevator mechanism automatically leads the clutch pedal towards up. This eliminates the need for pushing the clutch pedal when the speed of the vehicle increases and the user need to change to the gear 2 unless when the user want to change the gear or brake.

In this stage, the user needs to push the clutch pedal for changing the gear for a placement of the clutch pedal in the top. To facilitate this, a special key is devised and installed above the speed gear. Upon pressing the special key, the user may change the gear. Then the clutch pedal returns to its previous place, when the user releases the special key.

In the situation, when the user wants to stop the vehicle, the automatic clutch system will function as follows. If the vehicle's speed is less than the required speed, by releasing the gas pedal, the clutch pedal is lead downward and the user can brake and stop the vehicle. But if the speed of the vehicle is more than the required speed, by pressing the brake pedal, the automatic clutch system will keep up the clutch pedal until the speed is reduced to a speed less than the required speed for an optimized stopping operation. In this time the clutch pedal is lead downward automatically and the vehicle is ready to be stopped softly.

When your vehicle is stopped, the clutch pedal is lead downward. In this situation, when the vehicle is stopped for a long duration and the clutch pedal is kept at lower points, this may reduce the life of disk and the life of the clutch disk. To avoid this, a special key is designed and by pressing the key, the user may lead the clutch pedal downwards in case the vehicle takes a longer time to stop. The special key is installed on the steering wheel or over the speed gear of the vehicle or temporarily installed on the front section of the command box.

The automatic clutch system of the embodiments herein is an electromechanical system, which fully eliminates the need for a clutch pedal in vehicles and provides the user to drive in all driving situations without the need for a clutch pedal. The automatic clutch system can be installed in minimal time as less than 10 min and whenever the automatic clutch system is not required, the user can retire it and use the conventional clutch pedal of the vehicle. The automatic clutch system can be installed on all vehicles having different clutch pedals and its price is economical. In addition, the user may disassemble the auto clutch system from the user vehicle and install it on another vehicle.

The automatic clutch system controls the clutching of the vehicle based on a pressure applied on the gas pedal by the user and in proportion to the speed of the vehicle. With a single regulation of system's electrical circuit, one can convert a manual transmission in a vehicle to a full auto-clutch vehicle (semi-automatic transmission) and eliminate the clutch pedal from the vehicle to drive in all speeds without the need for pressing a clutch pedal.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

Although the embodiments herein are described with various specific embodiments, it will be obvious for a person skilled in the art to practice the invention with modifications. However, all such modifications are deemed to be within the scope of the claims.

It is also to be understood that the following claims are intended to cover all of the generic and specific features of the embodiments described herein and all the statements of the scope of the embodiments which as a matter of language might be said to fall there between.

What is claimed is:

1. An automatic clutch system for automobiles comprising:
 a mechanical section; wherein the mechanical section comprises a rail support base with a rail-shaped ridge installed on a flooring of a vehicle, a plurality of dynamic parts installed on the rail-shaped ridge, a first set of supporting arms, a second set of supporting arms, a clutch pedal of the vehicle, an elevator mechanism connected to the clutch pedal, and a clutch pedal lever for measuring and receiving a command from a gas pedal;
 an electronic section; wherein the electronic section comprises an input section for providing an instruction related to a positioning and a regulation of the elevator mechanism, an output section to change a linear position of the elevator mechanism according to the instruction from the input section, a feedback circuit for maintaining a stability of a clutch operating system, a plurality of monitors for displaying an information related to a functioning status of the clutch operating system and a side regulations, a sensor circuit including a plurality of speed sensors to receive a data related to a speed of the vehicle and to regulate a clutching action in proportion to the speed of the vehicle, and a command circuit to receive a data from the input section, and to send a command to the output section, and to investigate an output reaction by the feedback circuit and to display the output reactions and to control the regulations on a plurality of monitors;

wherein the command circuit of the electronic section processes an instruction data from an input resources through a microcontroller based on the regulations set by the user and transmits a command instruction to the output section for a positioning of the elevator mechanism in the vehicle.

2. The system of claim 1, wherein the rail support base has a plurality of pyramidal ridges provided on a bottom surface to rigidly fix the rail support base on the flooring of the vehicle.

3. The system of claim 1, wherein the dynamic parts are provided with a plurality of ridges on a bottom surface to fix on the rail-shaped ridge of the rail support base and wherein the dynamic parts includes a first dynamic part, a second dynamic part and a third dynamic part and wherein the first dynamic part connects the rail support base to the flooring of the vehicle through a plurality of bolts and wherein the second dynamic part and the third dynamic part support the elevator mechanism over the rail support base.

4. The system of claim 1, wherein one end of the first set of supporting arms is connected to a lower section of the elevator mechanism and another end of the first set of supporting arms is connected to the second dynamic frame to support the elevator mechanism over the rail support base.

5. The system of claim 1, wherein one end of the second set of supporting arms is connected to the elevator mechanism at center and another end of the second set of supporting arms is connected to the third dynamic frame so that an inclination angle of the elevator mechanism is varied against the clutch pedal of the vehicle.

6. The system of claim 1, wherein the elevator mechanism has a flooring connected to the rail support base through the first set of supporting arms and the second dynamic frame.

7. The system of claim 1, wherein the elevator mechanism has a lower elevator axle and an upper elevator axle and wherein the lower elevator axle and the upper elevator axle include a plurality of coils and wherein the lower elevator axle and the upper elevator axle are arranged at an upper section and at a lower section of the elevator mechanism.

8. The system of claim 1, wherein a length of the upper elevator axles is more than a length of the lower elevator axles such that one end of the upper elevator axles protrudes from the parallel rails thereby connecting one end of the upper elevator axles to an electromotor shaft and connecting another end of the upper elevator axles to an encoder in the elevator mechanism.

9. The system of claim 1, wherein the feedback circuit reports an output status to the command circuit to assess the output status and to maintain a stability of the system.

10. The system of claim 1, wherein the inputs status, the outputs status, the feedback and general alignments are displayed in the plurality of monitors all the time.

11. The system of claim 1, wherein the gas pedal rotates around an axle when a pressure is applied on the gas pedal and wherein the gas pedal is connected to a rotary encoder and wherein the rotary encoder generates 360 pulses for each rotation resulting in a change in an angle of the elevator mechanism.

12. The system of claim 1, wherein a processor receives the pulses generated by the rotary encoder to calculate a rate of change in the angle of the elevator mechanism to send a required command to the output section.

13. The system of claim 1, wherein the output section further comprises a DC engine to convert an electrical energy into a mechanical energy for changing a position of the elevator mechanism.

14. The system of claim 1, wherein the output circuits, input circuits, samplers and monitors are attached to the microcontroller in the command circuit.

15. The system of claim 1, wherein the axle of the rotary encoder is directly connected to an axle of an engine in the feedback circuit and wherein with the axle of the rotary encoder is rotated once corresponding to each rotation of the axle of the engine, and wherein the microcontroller processes the pulses generated by the encoder to analyze a data related to a position of the elevator mechanism to ensure a stability of the system.

16. The system of claim 1 further comprises a command box for regulating the automatic clutch system, and wherein the command box comprises a key pad for regulating and changing data, and wherein the command box includes a 7-section monitor to display all digits related to the regulations and to register a change with respect to a reaction of elevator mechanism, and wherein the command box includes
 a graphic LCD monitor to display a location of the elevator mechanism in numerical percentages.

17. The system of claim 1, wherein the elevator mechanism further comprises:
 a plurality of parallel rails with grooves, and wherein a lower ends of the plurality of parallel rails is connected to the lower elevator axle and wherein an upper end of the plurality of parallel rails is connected to the upper elevator axle;
 a plurality of moving blocks placed inside the grooves by a plurality of ball bearings;
 a flooring connected to the plurality of moving blocks to move with a movement of the plurality of moving blocks inside the plurality of parallel rails;
 a lower frame to connect a lower ends of the plurality of parallel rails to the second set of supporting arms;
 an upper frame with a furrow connected to an upper ends of the plurality of parallel rails;
 an electromotor placed inside the furrow provided in the upper frame;
 a chain to connect the upper elevator axles to an electromotor shaft with a plurality of cogwheels thereby enabling the upper elevator axles to move along with a movement of the electromotor;
 a twin chain set placed around the upper elevator axles and the lower elevator axles by a plurality of cogwheels for connecting the upper elevator axles and the lower elevator axles to each other such that the lower elevator axles is rotated with a rotation of the upper elevator axle;
 a clamp for connecting the twin chains set to the flooring to move the flooring with a movement of the twin chain set;
 a twin chain regulation clamp placed among the plurality of parallel rails to regulate softness and tightness of the twin chain set;
 a central support frame connected to the plurality of parallel rails at a center and wherein the central support frame is suspended to connect the elevator mechanism to the first set of supporting arms; and a connecting clamp for connecting an first encoder to one ends of the upper elevator axles such that the first encoder shaft is rotated with a rotation of the upper elevator axles to measure a movement of the elevator mechanism.

18. The system of claim 1, wherein the clutch pedal lever further comprises:
a set of supporting arms connected to one end of the plurality of rail support base;
a connector lever, wherein the connector lever includes a coil of wire screwed inside a vacuum pipe to adjust a length of the screwed wire; and
a support base connected to the screwed wire of the connector lever and wherein the supporting base is connected to the connecter lever such that the connector lever creates an angle of 90° with the screwed wire;
wherein the rail support base and the set of supporting arms are placed collaterally against each other so as to share a single axis.

19. The system of claim 1, wherein the gas lever further comprises:
a handhold placed underneath the gas pedal;
a shaft placed inside a main box;
a connector bushing for connecting the shaft to the handhold;
a spring for providing an elastic rotation to the shaft;
a rotary encoder connected to the shaft attached to handhold by a fine bushing and wherein the fine bushing is arranged inside the main box; and
an encoder support frame connected to the main box by a plurality of bolts.

20. The system of claim 1 further comprises a connector coils installed inside a plurality of grooves provided on the set of support arms to regulate a distance between the support arms and the gas pedal of the vehicle.

21. The system of claim 1, wherein the handhold is tightened by a bolt to an end of the shaft to regulate a handhold angle from the gas pedal such that a connection of the handhold to the shaft is removed upon loosening the bolt to regulate the angle of the handhold from the gas pedal in the vehicle.

22. The system of claim 1, wherein a second encoder is installed in the gas lever to measure an action of the gas pedal in the vehicles, and wherein the first encoder installed in the elevator mechanism and the second encoder installed in the gas pedal are connected to the electronic section.

23. The system of claim 1, wherein the automatic clutch system controls a clutching operation based on a pressure applied on the gas pedal in proportion to a speed of the vehicle through a single regulation of the electrical circuit.

* * * * *